(12) United States Patent
Lee

(10) Patent No.: US 10,846,596 B2
(45) Date of Patent: Nov. 24, 2020

(54) FILTERING, SMOOTHING, MEMETIC ALGORITHMS, AND FEASIBLE DIRECTION METHODS FOR ESTIMATING SYSTEM STATE AND UNKNOWN PARAMETERS OF ELECTROMECHANICAL MOTION DEVICES

(71) Applicant: Daniel Chonghwan Lee, Burnaby (CA)

(72) Inventor: Daniel Chonghwan Lee, Burnaby (CA)

( * ) Notice: Subject to any disclaimer, the term of this patent is extended or adjusted under 35 U.S.C. 154(b) by 1014 days.

(21) Appl. No.: 15/360,995

(22) Filed: Nov. 23, 2016

(65) Prior Publication Data

US 2017/0147922 A1 May 25, 2017

Related U.S. Application Data

(60) Provisional application No. 62/344,953, filed on Jun. 2, 2016, provisional application No. 62/258,824, filed on Nov. 23, 2015.

(51) Int. Cl.
*G06N 3/12* (2006.01)

(52) U.S. Cl.
CPC .............. *G06N 3/126* (2013.01); *G06N 3/12* (2013.01); *G06N 3/123* (2013.01)

(58) Field of Classification Search
None
See application file for complete search history.

(56) References Cited

U.S. PATENT DOCUMENTS

| | | | | |
|---|---|---|---|---|
| 6,701,016 B1* | 3/2004 | Jojic | ................... | G06K 9/6206 382/209 |
| 7,180,443 B1* | 2/2007 | Mookerjee | ............ | G01S 13/723 342/162 |
| 8,131,656 B2* | 3/2012 | Goldberg | ............... | G06N 3/126 706/13 |
| 8,700,686 B1* | 4/2014 | Savant | ................. | G05B 13/042 708/200 |
| 9,270,220 B2* | 2/2016 | Magee | ...................... | H02P 6/18 |
| 9,705,420 B2* | 7/2017 | Quevedo | ................. | H02P 27/12 |
| 2009/0033259 A1* | 2/2009 | Cesario | .................. | G05B 13/04 318/400.04 |
| 2009/0254202 A1* | 10/2009 | Pekar | ................... | G05B 13/048 700/29 |
| 2016/0237932 A1* | 8/2016 | Long | ..................... | F02D 41/045 |

\* cited by examiner

*Primary Examiner* — Kenny S Lin

(57) ABSTRACT

This document presents methods by which system parameters are tracked online. For adjusting the values of the system parameters, the presented methods take advantage of the data that become available during the system's operation. The values of the parameters can be used for estimating the system state and controlling the system. This document includes methods comprising constructing a cost function based on the data collected during the system operation as a function system parameters and running a memetic algorithm that reduces the cost function value. A memetic algorithm combines an evolutionary or a population-based algorithm with a procedure for local improvement (local search, refinements) of candidate solutions. This document includes methods by which the rotor speed, the rotor flux, and the stator currents of the induction motor can be estimated from electrical measurements while covariance matrices of noise are adjusted online.

20 Claims, 1 Drawing Sheet

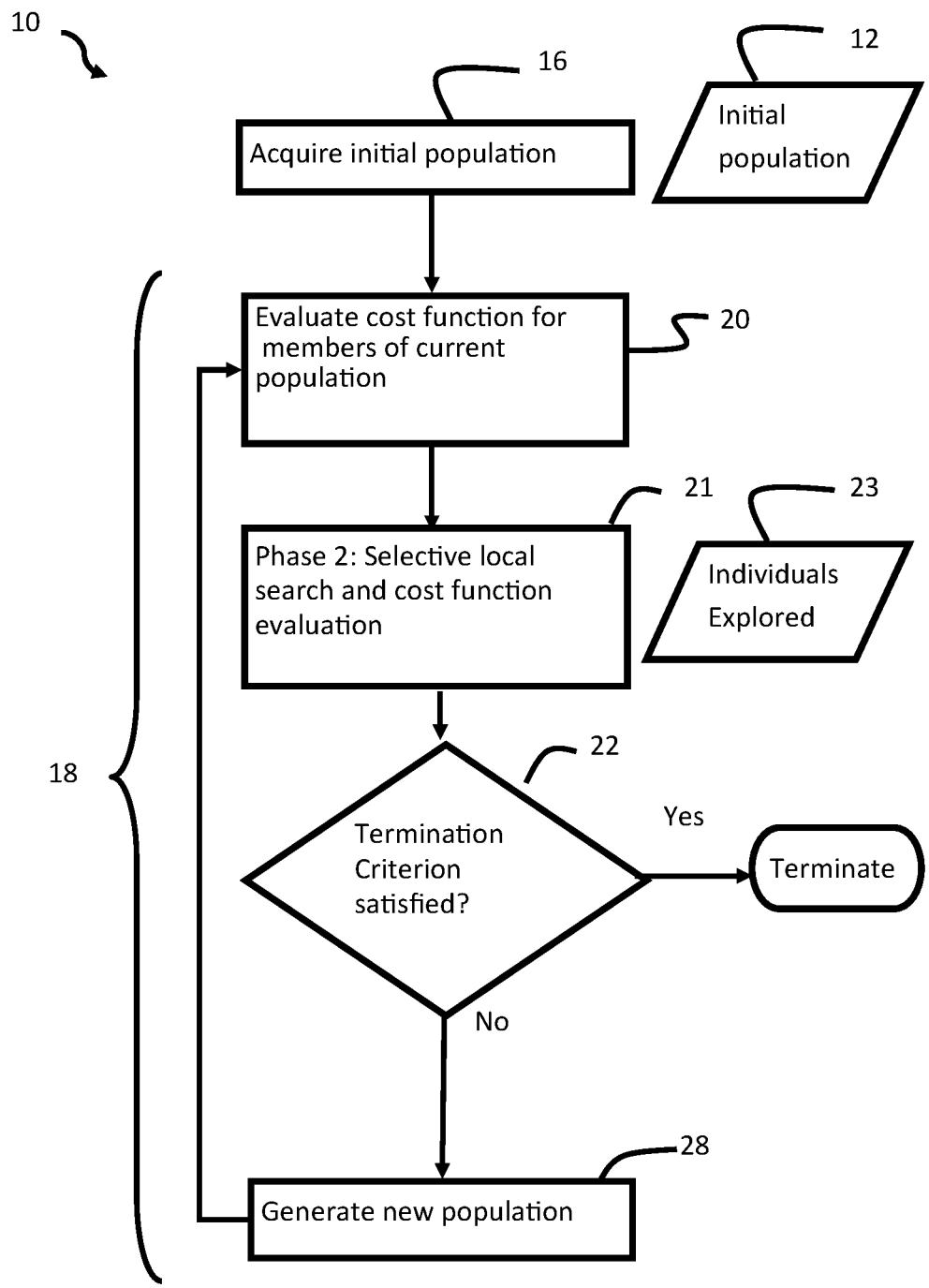

FILTERING, SMOOTHING, MEMETIC ALGORITHMS, AND FEASIBLE DIRECTION METHODS FOR ESTIMATING SYSTEM STATE AND UNKNOWN PARAMETERS OF ELECTROMECHANICAL MOTION DEVICES

CROSS-REFERENCE TO RELATED APPLICATIONS

This application claims the benefit of provisional patent application No. 62/258,824 filed 23 Nov. 2015 and entitled JOINT ONLINE ESTIMATION OF STATE, PROCESS NOISE COVARIANCE, AND OBSERVATION NOISE COVARIANCE FOR INDUCTION MOTOR and provisional patent application No. 62/344,953 filed 2 Jun. 2016 and entitled FILTERING, SMOOTHING, MEMETIC ALGORITHM, AND GRADIENT METHODS FOR ESTIMATION OF SYSTEM STATE AND UNKNOWN PARAMETERS.

BACKGROUND

A physical system such as such as an electromechanical device or a collection of devices is often designed and controlled based on a mathematical model of the system. For example, the dynamics of the stator currents $i_{sd}(t)$, $i_{sq}(t)$, rotor fluxes $\psi_{rd}(t), \psi_{rq}(t)$ can be modelled [1] by the following matrix equations.

$$\frac{d}{dt}\begin{pmatrix} i_{sd}(t) \\ i_{sq}(t) \\ \psi_{rd}(t) \\ \psi_{rq}(t) \end{pmatrix} = \tag{1}$$

$$\begin{pmatrix} -\gamma & 0 & \beta\alpha & \beta\omega(t) \\ 0 & -\gamma & -\beta\omega(t) & \beta\alpha \\ \alpha L_M & 0 & -\alpha & -\omega(t) \\ 0 & \alpha L_M & \omega(t) & -\alpha \end{pmatrix}\begin{pmatrix} i_{sd}(t) \\ i_{sq}(t) \\ \psi_{rd}(t) \\ \psi_{rq}(t) \end{pmatrix} + \begin{pmatrix} 1/\sigma & 0 \\ 0 & 1/\sigma \\ 0 & 0 \\ 0 & 0 \end{pmatrix}u(t) + W(t)$$

where $\alpha, \sigma, \beta, \gamma$ are positive parameters derived from resistances and inductances of the motor. Namely, the rotor resistance denoted by $R_r$, the stator resistance denoted by $R_S$, the rotor inductance denoted by $L_r$, the stator inductance denoted by $L_S$, the mutual inductance denoted by $L_M$, parameters $\alpha, \sigma, \beta, \gamma$ are defined as $$\alpha = \frac{R_r}{L_r}, \tag{2}$$

$$\sigma = L_s\left(1 - \frac{L_M^2}{L_s L_r}\right),$$

$$\beta = \frac{L_M}{\sigma L_r} = \frac{L_M}{L_s L_r - L_M^2},$$

$$\gamma = \frac{R_s}{\sigma} + \beta \alpha L_M = \frac{R_s L_r^2 - R_r L_M^2}{(L_s L_r - L_M^2) L_r}.$$

W(t) is a vector random process representing the process noise. If the stator current is measured, the measured values can be modeled as $$\begin{pmatrix} y_{sd}(t) \\ y_{sq}(t) \end{pmatrix} = \begin{pmatrix} i_{sd}(t) + Z_d(t) \\ i_{sq}(t) + Z_q(t) \end{pmatrix}$$

$$= \begin{pmatrix} 1 & 0 & 0 & 0 \\ 0 & 1 & 0 & 0 \end{pmatrix}\begin{pmatrix} i_{sd}(t) \\ i_{sq}(t) \\ \psi_{rd}(t) \\ \psi_{rq}(t) \end{pmatrix} + \begin{pmatrix} Z_d(t) \\ Z_q(t) \end{pmatrix},$$

where $Z_d(t)$ and $Z_q(t)$ are random processes representing the measurement noise. These equations have the form of input-state-output mathematical model, where the input signal is denoted by vector u(t); the output signal comprises functions $y_{sd}(t)$ and $y_{sq}(t)$ of time t; and the state variables are $i_{sd}(t)$, $i_{sq}(t), \psi_{rd}(t), \psi_{rq}(t)$. Vector variable u(t) can be interpreted as voltage signals in the d-q frame [1] applied to the motor as control signals to control the speed of the rotor.

For the purpose of controlling the rotor's speed, the control signal u(t) can be determined on the basis of the estimated values of the state variables and a reference signal provided to the controller, a reference signal that specifies the intended trajectory of the rotor speed as a function of time t. The state variables can be estimated based on the measured output $y_{sd}(t), y_{sq}(t)$ and the input signal u(t) applied. The state estimation can be performed by an estimator circuit that implements an estimation method. Methods of state estimation includes the Kalman filter [27], the extended Kalman filter [29], the unscented Kalman filter [29], the particle filter [28], etc.

For implementing the online estimator on a microprocessor, a discrete-time model is better suited, and for sampling time $T_s$, the system dynamics of sampled variables $u[k] \equiv u(kT_s)$ and $$x[k] \triangleq (i_{sd}(kT_s) i_{sq}(kT_s) \psi_{rd}(kT_s) \psi_{rq}(kT_s))^T,$$

where superscript T means matrix transpose, can be modeled as:

$$x[k+1] = A(\omega)x[k] + \begin{pmatrix} T_S/\sigma & 0 \\ 0 & T_S/\sigma \\ 0 & 0 \\ 0 & 0 \end{pmatrix}u[k], \tag{3}$$

In particular, with the first-order approximation of matrix exponential, $\exp[A_c(\omega)] \approx I + A_c(\omega)T_s$, we can use $$A(\omega) = \begin{pmatrix} 1 - \gamma T_S & 0 & \beta\alpha T_S & \beta\omega T_S \\ 0 & 1 - \gamma T_S & -\beta\omega T_{Ss} & \beta\alpha T_S \\ \alpha L_M T_S & 0 & 1 - \alpha T_S & -\omega T_S \\ 0 & \alpha L_M T_S & \omega T_S & 1 - \alpha T_S \end{pmatrix}, \tag{4}$$

In estimating the rotor speed, rotor flux, and the stator currents, we can assume that the rotor speed is constant between consecutive sampling times. This assumption significantly reduces computational cost because the load torque need not be estimated under this assumption.

Augmenting the system state with the rotor speed $\omega$, the state evolution can be described as:

$$\begin{pmatrix} x[k+1] \\ \omega[k+1] \end{pmatrix} = \begin{pmatrix} A(\omega[k]) & 0 \\ 0 & 1 \end{pmatrix}\begin{pmatrix} x[k] \\ \omega[k] \end{pmatrix} + Bu[k] \text{ where} \tag{5}$$

$$B = \begin{pmatrix} T_S/\sigma & 0 \\ 0 & T_S/\sigma \\ 0 & 0 \\ 0 & 0 \\ 0 & 0 \end{pmatrix} \quad (6)$$

and u[n] is the control signal. In order to consider the random noise in the signal and modeling limitation, this document includes process noise $$W[k] = \begin{pmatrix} W^{dq}[k] \\ \eta[k] \end{pmatrix}, k = 0, 1, 2, \ldots \quad (15)$$

in the system model so that the system dynamics is modelled as $$\begin{pmatrix} x[k+1] \\ \omega[k+1] \end{pmatrix} = \begin{pmatrix} A(\omega[k]) & 0 \\ 0 & 1 \end{pmatrix} \begin{pmatrix} x[k] \\ \omega[k] \end{pmatrix} + Bu[k] + \begin{pmatrix} W^{dq}[k] \\ \eta[k] \end{pmatrix} \quad (7)$$

We can also model the measurements, which is the measurement of the stator currents, as $$Y[k] = C \begin{pmatrix} x[k] \\ \omega[k] \end{pmatrix} + Z[k] \text{ where} \quad (8)$$

$$C = \begin{pmatrix} 1 & 0 & 0 & 0 & 0 \\ 0 & 1 & 0 & 0 & 0 \end{pmatrix} \quad (9)$$

and random vector process Z[k],k=0,1,2, . . . models the measurement noise. With this mathematical model, an estimator circuit can estimate and track the states x[k], ω[k], which include the rotor speed, rotor fluxes, and stator currents, from measurements y[0],y[1], . . . , y[k], at each discrete time k. A difficulty in such estimation and tracking is that the statistical nature of noise processes $$\begin{pmatrix} W^{dq}[k] \\ \eta[k] \end{pmatrix}, Z[k], k = 0, 1, 2, \ldots$$

may not be known. The statistical nature of noise can be specified by a set of parameters such as the mean and covariance matrix of the noise. In fact, the mathematical model includes parameters other than those specifying the statistical nature of noise. For example, mathematical models (1), (3)-(6) uses parameters α,β,γ,σ.

In many cases, the parameters in the mathematical model is determined offline from experimental data and possibly with training input signals. Indeed, methods of determining the system parameters have been presented—e.g., [7]. However, experimentation can be costly, and parameter values may change as the system's operational environments change. The present document includes methods of determining and updating the values of such unknown system parameters for use such as in estimating the system state and controlling the system. As for this particular example of this induction motor, this document includes methods of determining and updating values of noise covariance matrices the basis of the system observations (measurements of the stator's electrical currents) while the online estimation and tracking of state $$\begin{pmatrix} x[k] \\ \omega[k] \end{pmatrix}$$

is being performed.

For simple illustration of the methods to be presented, we assume that the noise processes $$\begin{pmatrix} W^{dq}[k] \\ \eta[k] \end{pmatrix} = W[k], Z[k], k = 0, 1, 2, \ldots$$

have 0-mean. The covariance of the process noise W[k] is denoted by Q, and the covariance of observation noise Z[k] is denoted by R. Some methods presented in this document updates the estimate of Q and R on the basis of new measurements online while tracking the states x[k], ω[k]. It is to be noted that even if the covariance Q and R change over time, the methods to be presented can track the change on the basis of new measurements.

The control input u[ ] may be determined by the controller based on a reference signal. For example, the reference signal may be a desired rotor angular speed schedule, which we denote by ω*[ ]. The reference signal may include one or more components of desired rotor flux vector schedule, and we denote by $\psi_{rd}$*[ ] the direct component of the rotor flux schedule and by $\psi_{rq}$*[ ] the quadrature component. The control input u[ ] may be determined on the basis of the estimated state information, which depends on the values of the system parameters, as well as the reference signal. The state estimation can be used for determining the control input. Thus, the methods described in this document can be combined with control methods or control apparatuses. In the case in which the system parameters were known, many methods, such as the Kalman filter and smoothing, the extended Kalman filter and smoothing, the unscented Kalman filter, the particle filterer, etc., of estimating system states from observations are known. For example, the extended Kalman filter operation can be described as the following:

Filtered Cycle:

$$\begin{pmatrix} \hat{x}[t|t] \\ \hat{\omega}[t|t] \end{pmatrix} = \begin{pmatrix} \hat{x}[t|t-1] \\ \hat{\omega}[t|t-1] \end{pmatrix} + \hat{P}[t|t-1]C^T(C\hat{P}[t|t-1]C^T + R)^{-1} \quad (10)$$

$$\left\{ y[t] - C \begin{pmatrix} \hat{x}[t|t-1] \\ \hat{\omega}[t|t-1] \end{pmatrix} \right\}$$

$$= \begin{pmatrix} \hat{x}[t|t-1] \\ \hat{\omega}[t|t-1] \end{pmatrix} + \hat{P}[t|t-1]C^T \begin{pmatrix} a & b \\ b & d \end{pmatrix}^{-1}$$

$$\left\{ y[t] - C \begin{pmatrix} \hat{x}_1[t|t-1] \\ \hat{x}_2[t|t-1] \end{pmatrix} \right\}$$

where $\hat{x}_i$[t|t−1] denotes the ith element of column vector $\hat{x}$[t|t−1]; $\hat{P}_{ij}$[t|t−1] denotes the ith-row and jth-column entry of matrix P[t|t−1], and $$a = \hat{P}_{11}[t|t-1] + r_{11}, b = \hat{P}_{12}[t|t-1] + r_{12}, d = \hat{P}_{22}[t|t-1] + r_{22}$$

Covariance-related variable is updated as the following:

$$\hat{P}[t|t] = \hat{P}[t|t-1] ]-\hat{P}[t|t-1]C^T(C\hat{P}[t|t-1]C^T+R)-1C\hat{P}[t|t-1] \quad (11)$$

Predict Cycle:

$$\begin{pmatrix} \hat{x}[t+1|t] \\ \hat{\omega}[t+1|t] \end{pmatrix} = \begin{pmatrix} A(\hat{\omega}[t|t])\hat{x}[t|t] \\ \hat{\omega}[t|t] \end{pmatrix} + Bu[t] \quad (12)$$

$$\hat{P}[t+1|t] = \begin{pmatrix} A(\hat{\omega}[t|t]) & 0 \\ 0 & 1 \end{pmatrix} \hat{P}[t|t] \begin{pmatrix} A(\hat{\omega}[t|t]) & 0 \\ 0 & 1 \end{pmatrix}^T + Q \quad (13)$$

However, the values of parameters Q, R, and other system parameters are often unknown. This document includes methods of determining, tuning, and updating those unknown parameters for use in state estimation and control, so the methods described in this document can be combined with the other methods of estimating system states.

SUMMARY

This document presents methods by which system parameters can be estimated and tracked online so that the estimated parameter values can be used for good performance of the physical system operation. The presented methods take advantage of the data that become available during the system's operation for adjusting the values of the system parameters. The values of the parameters can be used for estimating the system state and controlling the system. The described methods can be used to decide the values of system parameters such as covariance matrices of measurement (observation) noise and of process noise, etc., of the system.

This document includes computationally efficient methods that construct a cost function based on the data collected during the system operation as a function of one or more system parameters and running a memetic algorithm [8,9,10] that reduced the cost function value. A memetic algorithm combines an evolutionary or a population-based algorithm with a procedure for local improvement (local search, refinements) of candidate solutions.

This document includes methods by which the rotor speed, rotor flux, and the stator currents of the induction motor can be estimated from stator electrical measurements, while covariance matrices of process noise and of measurement noise are adjusted online during system operation. The estimated rotor speed, rotor flux, and the stator currents can be used for controlling the rotor speed.

BRIEF DESCRIPTION OF DRAWINGS

FIG. 1 is a flow chart illustrating the application of a memetic algorithm to adjust system parameters.

DETAILED DESCRIPTION

I. Introduction

As illustrated by an induction motor case, a physical system can have an input-state-output mathematical model. An example of a discrete-time input-state-output model is:

$$x[k+1] = f_\theta(x[k], u[k]) + W_\theta[k],$$

$$y[k] = h_\theta(x[k], u[k]) + Z_\theta[k], \quad (14)$$

where vector function $X[\cdot]$ represents the state of the system; vector function $u[\cdot]$ represents the input signal; vector function $y[\cdot]$ represents the output signal; random signal represents process noise; signal $W_\theta[\cdot]$ represents process noise; signal $Z_\theta[\cdot]$ represents measurement observation) noise; subscript $\theta$ is a vector that represents one or a plurality of system parameters. Mapping $f_\theta(\cdot,\cdot)$ describes the state evolution of the system. Mapping $h_\theta(\cdot,\cdot)$ describes relation of the output signal to the system state and input signals. A special example of mapping $h_\theta(\cdot,\cdot)$ is $$h_\theta(x[k], u[k]) = C[k]x[k].$$

Input signal $u[\cdot]$ can be used to control the system. Often, the input signal value $u[k]$ at time k is decided based on the estimated value of the state $x[k]$ and some reference signal, $r[\ ]$. For example, the state estimation can be performed by an estimator circuit that produces the estimated value of the state based on the output signal $y[\cdot]$, and the reference signal may be the nominal trajectory of the system states $x[\cdot]$ along which the controller intends to drive the system. Or, the reference signal may be a nominal trajectory of some state variables or some output variables. Note that the value of parameter $\theta$ may change during the system operation. The present document presents methods of deciding the values of system parameters online and possibly track the parameter.

II. Framework of a Cost Function as a Function of the Parameter Values

The controller (or drive) of a system considers a reference trajectory of the system in deciding the values of control variable or variables. As an example, we now consider the case of an induction motor in which the motor drive (controller) determines the control variable values with the goal of realizing a schedule of the rotor angular speed $\omega^*[t]$. For example, the reference speed schedule can be:

$$\omega^*[t] = \begin{cases} 8 \times 10^{-3} t \text{ rad/s}, & t = 0, 1, \ldots, 1.5 \times 10^4 \\ 120 \text{ rad/s}, & t = 15001, \ldots, 3 \times 10^4 \\ 360 - 8 \times 10^{-3} t \text{ rad/s}, & t = 30001, \ldots, 4.25 \times 10^4 \\ 20 \text{ rad/s}, & t = 42501, \ldots, 5 \times 10^4 \end{cases}$$

As an example, we consider a system that performs the extended Kalman filter for estimating the system state (or part of the system state) and takes into consideration the estimated system state information as well as the reference signal in determining the control input. In the induction motor model (3)-(9), the controller will determine the control variable values (the d-q voltage in this document) $u[k] \equiv u(kT_S)$ at discrete time k in response to the speed command $\omega^*[t], t=0,1,2, \ldots, k$ and the extended Kalman filter estimation, $\hat{\omega}[t|t], t=0,1,2, \ldots, k$, of the rotor speed. We represent by vector $\lambda$ an ordered list of system parameters, where each component represents one system parameter. Some or all components of $\lambda$ may be unknown. We denote by vector $\mu$ the system parameter values used for state estimation and control. Thus, $\lambda$ represents the true values of the system parameters, part or all of which may be unknown, and these values are not determined by the state estimator or the system controller. On the other hand, the value of $\mu$ can be determined and updated by the state estimator or the system controller. In some cases, the value of $\mu$ used for estimating the system state and/or controlling the system can be interpreted as a system modules' (e.g., the state estimator's or the controller's) guess of the true value $\lambda$.

A method to determine, tune, or update vector $\mu$ is to choose the vector value that results in the least value of some cost function cost(µ) among the values of µ considered. For example, if the goal of the control is to track the speed of the rotor to the reference signal as close as possible, the function cost(µ) can be designed to represent how close the trajectory of the rotor speed is to the reference signal. For example, in order to determine the value of vector parameter µ on the basis of the data accumulated in discrete times t=1,2, . . . ,T, one can define $$\text{cost}(\mu) = \frac{1}{T} \sum_{t=1}^{T} \{\omega^S[t] - \omega^*[t]\}^2,$$

where $\omega^S[t]$ is the rotor's angular speed at time t known to the system (e.g., through direct measurements.) If measurements of rotor's angular speed are available, the angular speed measured at time t can be used as the value of $\omega^S[t]$. As a more general example, the cost function can be designed to be in the form of $$\text{cost}(\mu) = \frac{1}{|\Omega|} \sum_{t \in \Omega} |\omega^S[t] - \omega^*[t]|^q$$

for a positive number q, where $\Omega$ denotes a set of time points and $|\Omega|$ denotes the number of elements of set $\Omega$. Another example of the cost function is $$\text{cost}(\mu) = \frac{1}{|\Omega|} \sum_{t \in \Omega} |\omega^S[t] - \hat{\omega}_\mu[t \mid t]|^q,$$

where q can be any positive number, and $\hat{w}_\mu[t|t]$ is the estimation made from using parameter value µ of the system state ω[t] on the basis of observation up to time t. In the system in which measurements of the rotor's speed are not available, an example of the cost function can be in the form of $$\text{cost}(\mu) = \frac{1}{|\Omega|} \sum_{t \in \Omega} |\omega^*[t] - \hat{\omega}_\mu[t \mid t]|^q,$$

where q can be any positive number. The vector value of µ can be determined or updated online or offline by searching for the value of µ that results in a low cost(µ). A particular cost function cost(µ) implemented in a specific embodiment can be chosen based on a particular performance criterion chosen for the system.

A difficulty in finding a good value of µ is that the function cost(µ) may have many local minima. A good value of µ can be searched by an evolutionary algorithm. A good value of µ can also be searched by a memetic algorithm [8,9,10], which combines a population-based search method of evolutionary algorithms (EAs) and one or more refinement methods [8]. For example, a population-based search method employed by evolutionary algorithms such as the particle swarm optimization algorithm, the artificial bee colony algorithm, the biogeography-based optimization, the estimation-of-distribution algorithm, fireworks algorithm, etc. can be combined with a learning procedure capable of performing refinements of individual candidate solutions.

An example method that combines an evolutionary algorithm (EA) and local search has the following two phases in each iteration.
Phase 1: Based on the results of the previous iterations,
generate a population of candidate solutions (an EA step),
evaluate the cost function for the generated candidate solutions;
Phase 2: Select a subset of the current population;
with each candidate solution in the subset as an initial point, perform local search, and
add the some or all these candidate solutions explored by the local search or obtained by refinements to the population and evaluate the cost function of these candidate solutions;

FIG. 1 is a flow chart for a method 10 that illustrates the application of a memetic algorithm to determine the system parameters for system or apparatus operation. Method 10 acquires in block 16 an initial population 12 of individuals (candidate solutions), which are candidate values of the system parameter vector to be used. Block 16 may comprise generating candidate solutions randomly, for example, by drawing individuals from the set, which is called the feasible set, of possible parameter vectors according to a probability distribution function, taking a predetermined initial population of candidate solutions, which may be determined from domain knowledge of the particular system for which this method is embodied, etc. In some embodiments, one or more good candidate solutions are generated by a low complexity computation, e.g., running from a random initial vector a gradient or a gradient-like algorithm to obtain a locally best solution. Preferably, predetermined candidate solutions are augmented by the addition of randomly generated candidate solutions. Method 10 performs iterations of a sequence 18. Each iteration produces a new population of candidate solutions.

In block 20, the value of the cost function for each member of the current population is determined. The historically best candidate solution evaluated (the individual with the lowest cost function value) in the iterations may be kept in memory.

Block 21 comprises selecting a subset of individuals (candidate solutions) from the current population and explores one or more individuals related to the selected individuals. For example, an individual or individual newly explored in block 21 may be related to a selected individual in such a way as having a particular distance (e.g., a particular Euclidian distance) or less. An individual or individuals newly explored in 21 may be related to an individual selected from the current population in a way such as being in a direction opposite to the gradient of the cost function, where the gradient is evaluated at the selected individual. An individual or individuals newly explored in block 21 may be randomly generated or have random components. The set of individuals explored in block 21 may include a set of individuals sequentially generated starting from an individual selected from the current population, where the sequence is formed by moving in a direction opposite to the cost gradient evaluated in the previous individual in the sequence. The cost function values of some or all newly explored individuals are evaluated in block 21. The best individual historically evaluated (the individual with the lowest cost function value) in the iterations may be kept in memory.

Block 22 determines whether a termination criterion is satisfied. The termination condition may, for example, consider one or more of:

a value of the cost function for the best member of the current population, a number of iterations that have been completed, the difference in cost function value between the best individual from previous populations and the best individual in the current population.

For example, the termination condition may be satisfied if the value of the cost function for the best member of the current population is below a threshold value or more than a certain number of iterations has been completed.

If block 22 determines that the termination condition is satisfied, then the individual (candidate solution) that has the lowest cost function value among those that have been evaluated is taken to be the solution to be used by the system. The best individual among all populations of individuals evaluated from the initial population to the current iteration may be kept in memory. In some embodiments, the best member in each population is automatically included in the population in the next iteration, and the best solution in the current population is taken to be the solution if the termination condition is satisfied.

If block 22 does not determine that the termination condition is satisfied, then method 10 continues at block 28. Block 28 creates a new population of individuals. Block 28 may, for example, comprise generating new individuals randomly and combining new individuals with some of individuals evaluated already by block 20 or block 21 in current or previous iterations. The new population created by block 28 preferably depends on candidate solutions previously evaluated in block 20 or block 21 and the function values determined in block 20 or block 21.

Method 10 then completes then completes the iteration of sequence 18 by continuing to block 20.

As an example of a memetic algorithm that explores the space of the possible values of the system parameters, this document includes a method that combines an evolutionary algorithm and descent search [$_{11}$]. While descent search-based optimization algorithms, such as the steepest descent algorithm, the feasible direction method, have the weakness of potentially being trapped in a local minimum, the evolutionary algorithms (EAs), such as the genetic algorithm (GA), the particle swarm optimization (PSO), artificial bee colony algorithm, biogeography-based optimization, etc., can contribute to globally searching through the space of unknown parameter values. On the other hand, gradient-based algorithms can speed up the process of searching for a good solution locally.

Some embodiments of method 10 can be used to adjust the system parameters online while the system is in operation. For simplicity of illustration, we represent each discrete time by an integer. Denote by $\tau_l$ the lth discrete time at which the system parameter vector value to be used, denoted by $\mu$, is updated. At each update time $\tau_l$, an embodiment of method 10 can be used to find a new system parameter vector value of $\mu$ to set for future operation. For example, for some subset, $\Omega_l$, of discrete times $\{1, 2, \ldots, \tau_l\}$, where discrete time 0 is the initial time of system operation, method 10 can be used with cost function $$\text{cost}(\mu) = \frac{1}{\tau_l} \sum_{t=1}^{\tau_l} |\hat{\omega}_\mu[t|t] - \omega^S[t]|^q,$$

for a positive number q, where $\omega^S[t]$ is the rotor's angular speed at time t known to the system (e.g., through direct measurements), $\hat{\omega}_\mu[t|t]$ denotes the system's estimation of the state $\omega[t]$ resulting from using parameter vector value $\mu$ for the given input values applied and observation values obtained up to time t, and $|\Omega_l|$ denotes the cardinality (the number of elements) of set $\Omega_l$. For another example, method 10 can be used with cost function $$\text{cost}(\mu) = \frac{1}{|\Omega_l|} \sum_{t \in \Omega_l} |\omega^*[t] - \hat{\omega}_\mu[t|t]|^q,$$

where q is a positive number. An example of set $\Omega_l$ is $$\Omega_l = \{\xi_l, \xi_l+1, \xi_l+2, \ldots, \tau_l\},$$

for some time $\xi_l$. In online operation, if $\xi_l=1$ (i.e., if $\Omega_l=\{1, 2, \ldots, T_l\}$), all data available from the beginning of the system operation are considered at time $\tau_l$ for updating parameter vector $\mu$ value to be used after time $\tau_l$. If the state estimation scheme employed by the system or apparatus needs the expected value of the system state at time $\xi_l$ (the initial state in the time interval $\Omega_l=\{\xi_l, \xi_l+1, \xi_l+2, \ldots, \tau_l\}$) for computing $\hat{\omega}_\mu[t|t]$, the system state at time $\xi_l$ estimated by the system during the actual operation can be used for computing $\hat{\omega}_\mu[t|t]$ for a value $\mu$ to be explored. If the covariance matrix of the system state at time $\xi_l$ is needed for computing $\hat{\omega}_\mu[t|t]$, the system's actual estimation of that covariance at time $\xi_l$ during the actual operation can be used. Or, the expected value of the system state and its covariance at time $\xi_l$ (initial estimation) can be included as a parameter in vector $\mu$ and be part of the cost function $\text{cost}(\mu)$ in updating the system parameter values at time $\tau_l$.

II.A Cost Function Shaped by Estimated Signals and Measured Signals

For a known, specific value of the control sequence, which is denoted by u[ ], the evolution of the system's state variable (e.g., the angular speed $\omega[t]$ in system (5)-(9)) may be affected by the random process noise (e.g., W[k] in system (5)-(9)), and thus, the evolution of the system's state variable depends on the true value of system parameters $\lambda$ (e.g. the covariance of the process noise), which many be unknown. The system's estimated state variable value typically depends not only on the true value of the system's parameter $\lambda$ but also on the value used by the estimator for state estimation. The present document denotes by $\mu$ the value of the system parameter used for the state estimation. In the case in which measurements of a state variable or state variables are available in the set, $\Omega$, of time points, the value $\mu$ to be used by the estimator can be determined by comparing the measured values of the state variable or variables and the estimated values of the state variable or variables.

As an example, for a known, specific value of the control sequence, and a set of measured angular speeds, $\{\omega^S[t] | t \in \Omega\}$, of the induction motor measured in the set of time points $\Omega$, the value of parameter vector $\mu$ to be used by the state estimator and/or controller can be explored to search for a value of $\mu$ resulting in a small $$\text{cost}(\mu) = \frac{1}{|\Omega|} \sum_{t \in \Omega} |\omega^S[t] - \hat{\omega}[t|t]|^q,$$

where q is a positive number and the choice of q is a design choice. We note that for a known, specific value of the control sequence, the estimated value $\hat{\omega}[t|t]$ depends on the system parameter value $\mu$ used for computing the estimation $\hat{\omega}[t|t]$, as can be illustrated in the example estimator (10)-(13). The value of μ that results in a small value of cost(μ) can be searched by an evolutionary algorithm. The value μ can also be searched by a memetic algorithm, which combines an evolutionary algorithm and an individual learning procedure capable of performing local refinements.

As an example of a memetic algorithm that explores the space of the possible values of the system parameters, we now discuss a method that combines an evolutionary algorithm and gradient-based search. As an example, we consider the induction motor modelled by equations (5)-(9). We consider the case in which the noise covariance matrices Q and R are unknown. For simple illustration, we consider cases in which both of these matrices are diagonal matrices. We rearrange the elements of these matrices into a 1-dimensional vector μ. We consider the case in which the measurements of the rotor's angular speed are available in the set of time points $\Omega = \{t | t=1,2, \ldots, T\}$.

The method being described for determining the vector value of μ now is to find the value of μ so that $$\text{cost}(\mu) = \frac{1}{|\Omega|} \sum_{t \in \Omega} |\omega^S[t] - \hat{\omega}[t|t]|^2$$

is small. We first note that the numerical value of $\omega^S[t]$ is available from measurement for each $t \in \Omega$ and the estimated value $\hat{\omega}[t|t]$ typically depends on the parameter value μ used by the state estimator. For a given sequence of control u[t], t=1,2, ..., the state of the system evolves in accordance with (7). That is, for a given sequence of control inputs u[t], t=1,2, ..., the realization of random state sequence is determined by the realization of the random process noise sequence W[t], t=1,2, .... Also, in accordance with (5)-(9), the for a given sequence of control u[t], t=1,2, ..., the realization of the random observation sequence Y[t], t=1,2, ... is determined by the realization of the random process noise sequence W[t], t=1,2, ... and the realization of the random observation noise sequence Z[t], t=1,2, .... It should be noted that for a given control sequence u[t], t=1,2, ..., and a given realization of process and observation noise sequences W[t], Z[t], t=1,2, ..., the state evolution is deterministic and does not depend on the parameter Q and R used for the extended Kalman filter. Accordingly, for a given sequence, u[t], t=1,2, ..., and realization of W[t], Z[t], t=1,2, ..., the sequence of measured rotor speeds, $\omega^S[t]$, does not depend on the value of parameter Q and R used for the extended Kalman filter (EKF) (10)-(13); we denote by μ these parameter values used for this estimating filter. In contrast, the realization of the sequence of state estimation, $\hat{\omega}[t|t]$, t=1,2, ... depends on μ, the parameter values of Q and R used (set) for state estimation as seen in EKF computation (10)-(13), even for a given control sequence control u[t], t=1,2, ..., and a given realization of process and observation noise sequences W[t], Z[t], t=1,2, .... A method to determine the values μ to be used by the state estimator for high performance of speed estimation is to choose the values that minimize $$\frac{1}{T} \sum_{t=1}^{T} \{\hat{\omega}_\mu[t|t] - \omega^S[t]\}^2$$

where $\hat{\omega}_\mu[t|t]$ denotes the estimated value resulting from using the system parameter value μ, of the angular speed (part of the system state) at time t. Note that in this document the subscript μ in the estimator's variables will be often omitted for simple notation.

For simple illustration of the basic idea we assume that the state estimator (the extended Kalman filter in this example) uses diagonal matrices $$Q = \text{diag}(\mu_1, \mu_2, \mu_3, \mu_4, \mu_5),$$

$$R = \text{diag}(\mu_6, \mu_7),$$

where $\mu = (\mu_1, \mu_2, \mu_3, \mu_4, \mu_5, \mu_6, \mu_7)^T$. A challenging aspect of this optimization problems is that the number of terms in the cost function $$\text{cost}(\mu) = \frac{1}{T} \sum_{t=1}^{T} \{\hat{\omega}_\mu[t|t] - \omega^S[t]\}^2$$

can be very large (i.e., a large T) and the fact that terms $$\{\hat{\omega}_\mu[t|t] - \omega^S[t]\}^2$$

for different values of t are coupled. Also, the cost function $$\text{cost}(\mu) = \frac{1}{T} \sum_{t=1}^{T} \{\hat{\omega}_\mu[t|t] - \omega^S[t]\}^2$$

is not necessarily convex. Among the methods to cope with a non-convex cost function in global optimization is the genetic algorithm. In [7], applying the idea of the genetic algorithm yielded good values of μ—values that lead to relatively accurate speed estimates $$\hat{\omega}_\mu[t|t].$$

The present document notes that other evolutionary algorithms can be used instead of the genetic algorithm. The present document also notes that evolutionary algorithms can be coupled with machine learning methods to find a good value of system parameters. For example, a population-based evolutionary algorithm (e.g. the particle swarm optimization algorithm, the estimation-of-distribution algorithm, fireworks algorithm, etc.) can be combined with an individual learning procedure capable of performing local refinements. This document includes a new algorithm that combines the global search capability of evolutionary algorithms (EAs) with gradient-like algorithms' capability for local search. While gradient-based optimization algorithms, such as the steepest descent algorithm, have the weakness of potentially being trapped in a local minimum, the evolutionary algorithms (EAs), such as the genetic algorithm (GA), the particle swarm optimization (PSO), etc., can contribute to globally searching through the space of unknown parameter values. On the other hand, gradient-like algorithms can speed up the process of searching for a good solution locally. An example of an algorithm that combines an evolutionary algorithm (EA) and refinements (or local search) has the following two phases in each iteration.

Phase 1: Based on the results of the previous iterations, generate a population of candidate solutions (an EA step), evaluate the cost function for the generated candidate solutions;

Phase 2: Select a subset of the current population;
with each candidate solution in the subset as an initial point, run a gradient or a gradient projection [11] algorithm:

$$\mu^{l+1}=[\mu^l-\alpha^l\nabla\text{cost}(\mu^l)]^+, \quad (20)$$

and add some or all these candidate solutions explored by the gradient algorithm or the gradient projection algorithm to the population and evaluate the cost function of these candidate solutions;

where $\alpha^l$ is the step size of the gradient or the gradient-like algorithm. [ ]$^+$ denotes adjustment onto the feasible set of parameter vectors. For example, in the case of the induction motor model (5)-(9), [ ]$^+$ can be a projection onto the positive orthant.

We now focus on the computation of the gradient $\nabla\text{cost}(\mu)$ and some properties of such computation. Denote by $\mu$ an arbitrary component of vector $\mu$. Then, $$\frac{\partial}{\partial\mu}\text{cost}(\mu) = \frac{1}{T}\sum_{t=1}^{T}2\{\hat{\omega}_\mu[t\mid t] - \omega^S[t]\}\frac{\partial\hat{\omega}_\mu[t\mid t]}{\partial\mu} \quad (21)$$

It is quite interesting that these partial derivatives can be computed recursively—that is, $$\frac{\partial}{\partial\mu}\hat{\omega}_\mu[k\mid k]$$

can be computed from $$\frac{\partial}{\partial\mu}\hat{\omega}_\mu[t\mid t], t = 1, 2, 3, \ldots, k-1$$

with minor additional amount of computation. This recursive relation can be derived from the extended Kalman filter recursion. From equations (10)-(13), we have $$\frac{\partial}{\partial\mu}\begin{pmatrix}\hat{x}_\mu[t\mid t]\\\hat{\omega}_\mu[t\mid t]\end{pmatrix} = \frac{\partial}{\partial\mu}\begin{pmatrix}\hat{x}_\mu[t\mid t-1]\\\hat{\omega}_\mu[t\mid t-1]\end{pmatrix} + \quad (22)$$

$$\left\{\frac{\partial\hat{P}_\mu[t\mid t-1]}{\partial\mu}C^T\right\}\begin{pmatrix}a & b\\b & d\end{pmatrix}^{-1}\left\{y[t] - \begin{pmatrix}\hat{x}_1[t\mid t-1]\\\hat{x}_2[t\mid t-1]\end{pmatrix}\right\} +$$

$$\hat{P}_\mu[t\mid t-1]C^T\left\{\frac{\partial}{\partial\mu}\begin{pmatrix}a & b\\b & d\end{pmatrix}^{-1}\right\}\left\{y[t] - \begin{pmatrix}\hat{x}_1[t\mid t-1]\\\hat{x}_2[t\mid t-1]\end{pmatrix}\right\} +$$

$$\hat{P}_\mu[t\mid t-1]C^T\begin{pmatrix}a & b\\b & d\end{pmatrix}^{-1}\left\{-\frac{\partial}{\partial\mu}\begin{pmatrix}\hat{x}_1[t\mid t-1]\\\hat{x}_2[t\mid t-1]\end{pmatrix}\right\}$$

As for the factor in the middle term in eqn. (22), we have $$\frac{\partial}{\partial\mu}\begin{pmatrix}a & b\\b & d\end{pmatrix}^{-1} = \frac{\partial}{\partial a}\begin{pmatrix}a & b\\b & d\end{pmatrix}^{-1}\frac{\partial a}{\partial\mu} + \frac{\partial}{\partial b}\begin{pmatrix}a & b\\b & d\end{pmatrix}^{-1}\frac{\partial b}{\partial\mu} + \quad (23)$$

$$\frac{\partial}{\partial d}\begin{pmatrix}a & b\\b & d\end{pmatrix}^{-1}\frac{\partial d}{\partial\mu}$$

$$= \frac{\partial}{\partial a}\begin{pmatrix}a & b\\b & d\end{pmatrix}^{-1}\frac{\partial}{\partial\mu}(\hat{P}_{11}[t\mid t-1] + r_{11}) +$$

$$\frac{\partial}{\partial b}\begin{pmatrix}a & b\\b & d\end{pmatrix}^{-1}\frac{\partial}{\partial\mu}(\hat{P}_{12}[t\mid t-1] + r_{12}) +$$

$$\frac{\partial}{\partial d}\begin{pmatrix}a & b\\b & d\end{pmatrix}^{-1}\frac{\partial}{\partial\mu}(\hat{P}_{22}[t\mid t-1] + r_{22})$$

In computing this, we note that we have partial derivatives, $$\frac{\partial}{\partial a}\begin{pmatrix}a & b\\b & d\end{pmatrix}^{-1} = \left\{\frac{\partial}{\partial a}\frac{1}{ad-b^2}\right\}\begin{pmatrix}d & -b\\-b & a\end{pmatrix} + \quad (24)$$

$$\frac{1}{ad-b^2}\frac{\partial}{\partial a}\begin{pmatrix}d & -b\\-b & a\end{pmatrix}$$

$$= \frac{-d}{(ad-b^2)^2}\begin{pmatrix}d & -b\\-b & a\end{pmatrix} + \frac{1}{ad-b^2}\begin{pmatrix}0 & 0\\0 & 1\end{pmatrix}$$

$$= \frac{\begin{pmatrix}0 & 0\\0 & 1\end{pmatrix} - d\begin{pmatrix}a & b\\b & d\end{pmatrix}^{-1}}{ad-b^2}$$

$$= \frac{\begin{pmatrix}0 & 0\\0 & 1\end{pmatrix} - (\hat{P}_{22}[t\mid t-1] + r_{22})}{\begin{pmatrix}\hat{P}_{11}[t\mid t-1] + r_{11} & \hat{P}_{12}[t\mid t-1] + r_{12}\\\hat{P}_{12}[t\mid t-1] + r_{12} & \hat{P}_{22}[t\mid t-1] + r_{22}\end{pmatrix}^{-1}}{(\hat{P}_{11}[t\mid t-1] + r_{11})(\hat{P}_{22}[t\mid t-1] + r_{22}) - (\hat{P}_{12}[t\mid t-1] + r_{12})^2}$$

$$\frac{\partial}{\partial b}\begin{pmatrix}a & b\\c & d\end{pmatrix}^{-1} = \left\{\frac{\partial}{\partial b}\frac{1}{ad-b^2}\right\}\begin{pmatrix}d & -b\\-b & a\end{pmatrix} + \quad (25)$$

$$\frac{1}{ad-b^2}\frac{\partial}{\partial b}\begin{pmatrix}d & -b\\-b & a\end{pmatrix}$$

$$= \frac{2b}{(ad-b^2)^2}\begin{pmatrix}d & -b\\-b & a\end{pmatrix} + \frac{1}{ad-b^2}\begin{pmatrix}0 & -1\\-1 & 0\end{pmatrix}$$

$$= \frac{\begin{pmatrix}0 & -1\\-1 & 0\end{pmatrix} + 2b\begin{pmatrix}a & b\\c & d\end{pmatrix}^{-1}}{ad-b^2}$$

$$= \frac{\begin{pmatrix}0 & -1\\-1 & 0\end{pmatrix} + 2(\hat{P}_{12}[t\mid t-1] + r_{12})}{\begin{pmatrix}\hat{P}_{11}[t\mid t-1] + r_{11} & \hat{P}_{12}[t\mid t-1] + r_{12}\\\hat{P}_{12}[t\mid t-1] + r_{12} & \hat{P}_{22}[t\mid t-1] + r_{22}\end{pmatrix}^{-1}}{(\hat{P}_{11}[t\mid t-1] + r_{11})(\hat{P}_{22}[t\mid t-1] + r_{22}) - (\hat{P}_{12}[t\mid t-1] + r_{12})^2}$$

-continued $$\frac{\partial}{\partial d}\begin{pmatrix} a & b \\ c & d \end{pmatrix}^{-1} = \frac{\begin{pmatrix} 1 & 0 \\ 0 & 0 \end{pmatrix} - d\begin{pmatrix} a & b \\ c & d \end{pmatrix}^{-1}}{ad - bc} \quad (26)$$

$$= \left\{\frac{\partial}{\partial d}\frac{1}{ad - b^2}\right\}\begin{pmatrix} d & -b \\ -b & a \end{pmatrix} +$$

$$\frac{1}{ad - b^2}\frac{\partial}{\partial d}\begin{pmatrix} d & -b \\ -b & a \end{pmatrix}$$

$$= \frac{-a}{(ad - b^2)^2}\begin{pmatrix} d & -b \\ -b & a \end{pmatrix} + \frac{1}{ad - b^2}\begin{pmatrix} 1 & 0 \\ 0 & 1 \end{pmatrix}$$

$$= \frac{\begin{pmatrix} 1 & 0 \\ 0 & 0 \end{pmatrix} - (\hat{P}_{11}[t \mid t-1] + r_1)}{\begin{pmatrix} \hat{P}_{11}[t \mid t-1] + r_{11} & \hat{P}_{12}[t \mid t-1] + r_{12} \\ \hat{P}_{12}[t \mid t-1] + r_{12} & \hat{P}_{22}[t \mid t-1] + r_{22} \end{pmatrix}^{-1}}{(\hat{P}_{11}[t \mid t-1] + r_{11})(\hat{P}_{22}[t \mid t-1] + r_{22}) - (\hat{P}_{12}[t \mid t-1] + r_{12})^2}$$

From equations (22)-(26), we note that $$\frac{\partial}{\partial \mu}\hat{\omega}_\mu[t \mid t]$$

and $$\frac{\partial}{\partial \mu}\hat{x}_\mu[t \mid t]$$

can be expressed in terms of the predictive estimates $\hat{\omega}_\mu[t|t-1]$, $\hat{x}_\mu[t|t-1]$, $\hat{P}_\mu[t|t-1]$, and their partial derivatives with respect to the parameter $\mu$, $$\frac{\partial}{\partial \mu}\hat{\omega}_\mu[t \mid t-1],$$

$$\frac{\partial}{\partial \mu}\hat{x}_\mu[t \mid t-1],$$

$$\frac{\partial}{\partial \mu}\hat{P}_\mu[t \mid t-1].$$

Now, the derivatives of the predictors can be expressed in terms of the derivatives of the estimators in accordance with (12) and (13). From (12) we have $$\frac{\partial}{\partial \mu}\begin{pmatrix} \hat{x}_\mu[t+1 \mid t] \\ \hat{\omega}_\mu[t+1 \mid t] \end{pmatrix} = \begin{pmatrix} \frac{\partial A(\hat{\omega}_\mu[t \mid t])}{\partial \mu}\hat{x}_\mu[t \mid t] + A(\hat{\omega}_\mu[t \mid t])\frac{\partial \hat{x}_\mu[t \mid t]}{\partial \mu} \\ \frac{\partial}{\partial \mu}\hat{\omega}_\mu[t \mid t] \end{pmatrix} \quad (27)$$

and from *eqn.* (7)

$$\frac{\partial A(\hat{\omega}[t \mid t])}{\partial \mu} = \begin{pmatrix} 0 & 0 & 0 & \beta T_s \frac{\partial \hat{\omega}[t \mid t]}{\partial \mu} \\ 0 & 0 & -\beta T_s \frac{\partial \hat{\omega}[t \mid t]}{\partial \mu} & 0 \\ 0 & 0 & 0 & -T_s \frac{\partial \hat{\omega}[t \mid t]}{\partial \mu} \\ 0 & 0 & T_s \frac{\partial \hat{\omega}[t \mid t]}{\partial \mu} & 0 \end{pmatrix}$$

Therefore, $$\frac{\partial}{\partial \mu}\hat{x}_\mu[t \mid t-1]$$

and $$\frac{\partial}{\partial \mu}\hat{\omega}_\mu[t \mid t-1]$$

can be obtained from the partial derivatives of the filtered estimate $$\frac{\partial}{\partial \mu}\hat{x}_\mu[t-1 \mid t-1]$$

and $$\frac{\partial}{\partial \mu}\hat{\omega}_\mu[t-1 \mid t-1].$$

As for the partial derivatives in matrix $$\frac{\partial}{\partial \mu}\hat{P}_\mu[t \mid t-1],$$

from eqn. (13) we can express them in terms of the partial derivatives of the filtered estimate.

$$\frac{\partial}{\partial \mu}\hat{P}_\mu[t+1 \mid t] = \frac{\partial\begin{pmatrix} A(\hat{\omega}[k]) & 0 \\ 0 & 1 \end{pmatrix}}{\partial \mu}\hat{P}_\mu[t \mid t]\begin{pmatrix} A(\hat{\omega}[k]) & 0 \\ 0 & 1 \end{pmatrix}^T + \quad (28)$$

$$\begin{pmatrix} A(\hat{\omega}[k]) & 0 \\ 0 & 1 \end{pmatrix}\frac{\partial \hat{P}_\mu[t \mid t]}{\partial \mu}\begin{pmatrix} A(\hat{\omega}[k]) & 0 \\ 0 & 1 \end{pmatrix}^T +$$

$$\begin{pmatrix} A(\hat{\omega}[k]) & 0 \\ 0 & 1 \end{pmatrix}\hat{P}_\mu[t \mid t]\frac{\partial\begin{pmatrix} A(\hat{\omega}[k]) & 0 \\ 0 & 1 \end{pmatrix}^T}{\partial \mu} + \frac{\partial Q}{\partial \mu}$$

and we have $$\frac{\partial}{\partial \mu}\begin{pmatrix} A(\hat{\omega}_\mu[t \mid t]) & 0 \\ 0 & 1 \end{pmatrix} = T_s\begin{pmatrix} 0 & 0 & 0 & \beta\frac{\partial \hat{\omega}_\mu[t \mid t]}{\partial \mu} & 0 \\ 0 & 0 & -\beta\frac{\partial \hat{\omega}_\mu[t \mid t]}{\partial \mu} & 0 & 0 \\ 0 & 0 & 0 & -\frac{\partial \hat{\omega}_\mu[t \mid t]}{\partial \mu} & 0 \\ 0 & 0 & \frac{\partial \hat{\omega}_\mu[t \mid t]}{\partial \mu} & 0 & 0 \\ 0 & 0 & 0 & 0 & 0 \end{pmatrix}$$

Thus, in computing $\partial\hat{\omega}[t|t]/\partial\mu$ from (22), all terms on the right-hand side other than the term y[t] can be obtained from values obtained in the EKF estimation and the gradient computation at time t−1 upon receiving measurement y[t−1]. This is an interesting property because this property allows for a recursion that makes computation of (21) simple.

We note that even if the actual speed data $\omega^S[t]$ are unavailable at time $t \notin \Omega$, computation that seeks the system parameter value $\mu$ with small $$\text{cost}(\mu) = \frac{1}{|\Omega|} \sum_{t \in \Omega} |\omega^S[t] - \hat{\omega}_\mu[t \mid t]|^q \quad (29)$$

can continue at times $t \notin \Omega$ on the basis of speed data $\{\omega^S[t] | t \in \Omega\}$, input data $\{u[t] | t \in \Omega\}$, and output data input data $\{y[t] | t \in \Omega\}$, which were collected in time set $\Omega$. For example, suppose that the speed sensor only operates in times $t \in \Omega$ to collect data $\{\omega^S[t] | t \in \Omega\}$.

Suppose the time set is $\Omega = \{1, 2, \ldots, T\}$ and at some time after T the system is operating with some system parameter value of $\mu_1$. While the system is operating, the system can still perform computation according to the method presented in order to determine a system parameter value that yields a lower cost value (29) than $\mu_1$. The system can change during its operation the system parameter value to be used from $\mu_1$ to a newly found value to improve system performance.

II.B Cost Function Shaped by Reference Signals and Estimated Signals

Another method of determining and updating system parameter values used by the estimators and the controllers is to include the reference signal used by the controller in shaping the cost function. For example, the cost function $$\text{cost}(\mu) = \frac{1}{|\Omega|} \sum_{t \in \Omega} |\omega^*[t] - \hat{\omega}[t \mid t]|^q,$$

where $\omega^*[t]$ is the reference signal used by the controller and $\hat{\omega}[t|t]$ the state estimator's estimation of the state based on system observations up to time t, for a selected set of time points $\Omega$ can be used for determining and updating $\mu$, the values of system parameter values used by the estimators and the controllers. The value of parameter vector $\mu$ to be used by the state estimator and controller can be explored to search for a value resulting in a small $$\text{cost}(\mu) = \frac{1}{|\Omega|} \sum_{t \in \Omega} |\omega^*[t] - \hat{\omega}[t \mid t]|^q,$$

where q is a positive number that can be chosen. We note that the reference signal $\omega^*[t]$ is known, and we note that for a known, specific value of control (system input) sequence, the estimated value $\hat{\omega}[t]$ depends on the system parameter value $\mu$ used for the estimation. The value $\mu$ can be searched by an evolutionary algorithm. The present document notes that other probabilistic evolutionary algorithm can be used instead of the genetic algorithm. The value $\mu$ can also be searched by a memetic algorithm, which combines an evolutionary algorithm and an individual learning procedure capable of performing local refinements.

As an example of a memetic algorithm that explores the space of the possible values of the system parameters, we now discuss a method that combines an evolutionary algorithm and gradient-based search. As an example, we consider the induction motor modelled by equations (5)-(9). We consider the case in which the noise covariance matrices Q and R are unknown. For simple illustration, we consider cases in which both of these matrices are diagonal matrices.

We rearrange the elements of these matrices into a 1-dimensional vector $\mu$. We consider the case in which the measurements of the rotor's angular speed are available in the set of time points $\Omega = \{t | t = 1, 2, \ldots, T\}$.

The method being described for determining the vector value of $\mu$ now is to find the value of $\mu$ so that $$\text{cost}(\mu) = \frac{1}{|\Omega|} \sum_{t \in \Omega} |\omega^*[t] - \hat{\omega}[t \mid t]|^2,$$

is small. We first note that the numerical value of the reference signal $\omega^*[t]$ is known to the system for each $t \in \Omega$, and the reference signal does not depend on the choice of system parameter value used by the state estimator. In contrast, the estimated value $\hat{\omega}[t|t]$ typically depends on the parameter value $\mu$ used by the state estimator. For example, the realization of the sequence of state estimation, $\hat{\omega}[t|t]$, $t = 1, 2, \ldots$ depends on $\mu$, the parameter values of Q and R used (set) for state estimation as seen in EKF computation (10)-(13), even for a given control sequence control $u[t]$, $t = 1, 2, \ldots$, and a given realization of process and observation noise sequences $W[t], Z[t], t = 1, 2, \ldots$. A method to determine the values $\mu$ to be used by the state estimator for high performance of speed estimation is to choose the values that minimize $$\frac{1}{T} \sum_{t=1}^{T} \{\hat{\omega}_\mu[t \mid t] - \omega^*[t]\}^2$$

where $\omega_\mu[t|t]$ denotes the estimated value resulting from using the system parameter value $\mu$, of the angular speed (part of the system state) at time t. Note that in this document the subscript $\mu$ in the estimator's variables will be often omitted for simple notation.

For simple illustration of the basic idea we assume that the state estimator (the extended Kalman filter in this example) uses diagonal matrices $Q = \text{diag}(\mu_1, \mu_2, \mu_3, \mu_4, \mu_5)$, $R = \text{diag}(\mu_6, \mu_7)$, where $\mu = (\mu_1, \mu_2, \mu_3, \mu_4, \mu_5, \mu_6, \mu_7)^T$.

A challenging aspect of this optimization problems is that the number of terms in the cost function $$\text{cost}(\mu) = \frac{1}{T} \sum_{t=1}^{T} \{\hat{\omega}_\mu[t \mid t] - \omega^*[t]\}^2$$

can be very large (i.e., a large T) and the fact that terms $\{\hat{\omega}_\mu[t|t] - \omega^*[t]\}^2$ for different values of t are coupled. Also, the cost function $$\text{cost}(\mu) = \frac{1}{T} \sum_{i=1}^{T} \{\hat{\omega}_\mu[t \mid t] - \omega^*[t]\}^2$$

is not necessarily convex. Among the methods to cope with a non-convex cost function in global optimization is the genetic algorithm.

The present document includes a new algorithm that combines the global search capability of evolutionary algorithms (EAs) with gradient-like algorithms' capability for local search. While gradient-based optimization algorithms, such as the steepest descent algorithm, have the weakness potentially being trapped in a local minimum, the evolutionary algorithms (EAs), such as the genetic algorithm (GA), the particle swarm optimization (PSO), etc., can contribute to globally searching through the space of unknown parameter values. On the other hand, gradient-like algorithms can speed up the process of searching for a good solution locally. An example of an algorithm that combines an evolutionary algorithm (EA) and refinement (local search) has the following two phases in each iteration.

Phase 1: Based on the results of the previous iterations,
   generate a population of candidate solutions (an EA step),
   evaluate the cost function for the generated candidate solutions;

Phase 2: Select a subset of the current population;
   with each candidate solution in the subset as an initial point, run a gradient or a gradient projection [11] algorithm:

$$\mu^{l+1} = [\mu^l \alpha^l \nabla \text{cost}(\mu^l)]^+, \quad (30)$$

and add some or all these candidate solutions explored by iteration (30) to the population and evaluate the cost function of these candidate solutions;

where $\alpha^l$ is the step size of the gradient or the gradient-like algorithm, and $[\ ]^+$ denotes adjustment onto the feasible set of parameter vector. For example, in the case of the induction motor model (5)-(9), $[\ ]^+$ can be a projection onto the positive orthant.

We now focus on the computation of the gradient $\nabla \text{cost}(\mu)$ and some interesting properties of such computation. Denote by $\mu$ an arbitrary component of system parameter vector $\mu$ to be used. Then, $$\frac{\partial}{\partial \mu} \text{cost}(\mu) = \frac{1}{T} \sum_{t=1}^{T} 2\{\hat{\omega}_\mu[t|t] - \omega^*[t]\} \frac{\partial \hat{\omega}_\mu[t|t]}{\partial \mu} \quad (31)$$

It is quite interesting that these partial derivatives can be computed recursively—that is, $$\frac{\partial}{\partial \mu} \hat{\omega}_\mu[k|k]$$

can be computed from $$\frac{\partial}{\partial \mu} \hat{\omega}_\mu[t|t],$$
$$t = 1, 2, 3, \ldots, k-1$$

with minor additional amount of computation. This recursive relation can be derived from the extended Kalman filter recursion. From equations (10)-(13), we have $$\frac{\partial}{\partial \mu}\begin{pmatrix} \hat{x}_\mu[t|t] \\ \hat{\omega}_\mu[t|t] \end{pmatrix} = \frac{\partial}{\partial \mu}\begin{pmatrix} \hat{x}_\mu[t|t-1] \\ \hat{\omega}_\mu[t|t-1] \end{pmatrix} + \quad (32)$$

$$\left\{ \frac{\partial \hat{P}_\mu[t|t-1]}{\partial \mu} C^T \begin{pmatrix} a & b \\ b & d \end{pmatrix}^{-1} \right\} \left\{ y[t] - \begin{pmatrix} \hat{x}_1[t|t-1] \\ \hat{x}_2[t|t-1] \end{pmatrix} \right\} +$$

$$\hat{P}_\mu[t|t-1] C^T \left\{ \frac{\partial}{\partial \mu}\begin{pmatrix} a & b \\ b & d \end{pmatrix}^{-1} \right\} \left\{ y[t] - \begin{pmatrix} \hat{x}_1[t|t-1] \\ \hat{x}_2[t|t-1] \end{pmatrix} \right\} +$$

$$\hat{P}_\mu[t|t-1] C^T \begin{pmatrix} a & b \\ b & d \end{pmatrix}^{-1} \left\{ -\frac{\partial}{\partial \mu}\begin{pmatrix} \hat{x}_1[t|t-1] \\ \hat{x}_2[t|t-1] \end{pmatrix} \right\}$$

As for the factor in the middle term in eqn. (32), we have $$\frac{\partial}{\partial \mu}\begin{pmatrix} a & b \\ b & d \end{pmatrix}^{-1} = \frac{\partial}{\partial a}\begin{pmatrix} a & b \\ b & d \end{pmatrix}^{-1} \frac{\partial a}{\partial \mu} + \frac{\partial}{\partial b}\begin{pmatrix} a & b \\ b & d \end{pmatrix}^{-1} \frac{\partial b}{\partial \mu} + \quad (33)$$

$$\frac{\partial}{\partial d}\begin{pmatrix} a & b \\ b & d \end{pmatrix}^{-1} \frac{\partial d}{\partial \mu}$$

$$= \frac{\partial}{\partial a}\begin{pmatrix} a & b \\ b & d \end{pmatrix}^{-1} \frac{\partial}{\partial \mu}(\hat{P}_{11}[t|t-1] + r_{11}) +$$

$$\frac{\partial}{\partial b}\begin{pmatrix} a & b \\ b & d \end{pmatrix}^{-1} \frac{\partial}{\partial \mu}(\hat{P}_{12}[t|t-1] + r_{12}) +$$

$$\frac{\partial}{\partial d}\begin{pmatrix} a & b \\ b & d \end{pmatrix}^{-1} \frac{\partial}{\partial \mu}(\hat{P}_{22}[t|t-1] + r_{22})$$

In computing this, we note that we have partial derivatives, $$\frac{\partial}{\partial a}\begin{pmatrix} a & b \\ b & d \end{pmatrix}^{-1} = \left\{\frac{\partial}{\partial a}\frac{1}{ad-b^2}\right\}\begin{pmatrix} d & -b \\ -b & a \end{pmatrix} + \frac{1}{ad-b^2}\frac{\partial}{\partial a}\begin{pmatrix} d & -b \\ -b & a \end{pmatrix} \quad (34)$$

$$= \frac{-d}{(ad-b^2)^2}\begin{pmatrix} d & -b \\ -b & a \end{pmatrix} + \frac{1}{ad-b^2}\begin{pmatrix} 0 & 0 \\ 0 & 1 \end{pmatrix}$$

$$= \frac{\begin{pmatrix} 0 & 0 \\ 0 & 1 \end{pmatrix} - d\begin{pmatrix} a & b \\ b & d \end{pmatrix}^{-1}}{ad-b^2}$$

$$= \frac{\begin{pmatrix} 0 & 0 \\ 0 & 1 \end{pmatrix} - (\hat{P}_{22}[t|t-1] + r_{22})}{\begin{pmatrix} \hat{P}_{11}[t|t-1] + r_{11} & \hat{P}_{12}[t|t-1] + r_{12} \\ \hat{P}_{12}[t|t-1] + r_{12} & \hat{P}_{22}[t|t-1] + r_{22} \end{pmatrix}^{-1}}{(\hat{P}_{11}[t|t-1] + r_{11})(\hat{P}_{22}[t|t-1] + r_{22}) - (\hat{P}_{12}[t|t-1] + r_{12})^2}$$

$$\frac{\partial}{\partial b}\begin{pmatrix} a & b \\ c & d \end{pmatrix}^{-1} = \left\{\frac{\partial}{\partial b}\frac{1}{ad-b^2}\right\}\begin{pmatrix} d & -b \\ -b & a \end{pmatrix} + \frac{1}{ad-b^2}\frac{\partial}{\partial b}\begin{pmatrix} d & -b \\ -b & a \end{pmatrix} \quad (35)$$

$$= \frac{2b}{(ad-b^2)^2}\begin{pmatrix} d & -b \\ -b & a \end{pmatrix} + \frac{1}{ad-b^2}\begin{pmatrix} 0 & -1 \\ -1 & 0 \end{pmatrix}$$

$$= \frac{\begin{pmatrix} 0 & -1 \\ -1 & 0 \end{pmatrix} + 2b\begin{pmatrix} a & b \\ c & d \end{pmatrix}^{-1}}{ad-b^2}$$

$$= \frac{\begin{pmatrix} 0 & -1 \\ -1 & 0 \end{pmatrix} + 2(\hat{P}_{12}[t|t-1] + r_{12})}{\begin{pmatrix} \hat{P}_{11}[t|t-1] + r_{11} & \hat{P}_{12}[t|t-1] + r_{12} \\ \hat{P}_{12}[t|t-1] + r_{12} & \hat{P}_{22}[t|t-1] + r_{22} \end{pmatrix}^{-1}}{(\hat{P}_{11}[t|t-1] + r_{11})(\hat{P}_{22}[t|t-1] + r_{22}) - (\hat{P}_{12}[t|t-1] + r_{12})^2}$$

-continued $$\frac{\partial}{\partial d}\begin{pmatrix} a & b \\ c & d \end{pmatrix}^{-1} = \frac{\begin{pmatrix} 1 & 0 \\ 0 & 0 \end{pmatrix} - d\begin{pmatrix} a & b \\ c & d \end{pmatrix}^{-1}}{ad - bc} = \quad (36)$$

$$= \left\{\frac{\partial}{\partial d}\frac{1}{ad - b^2}\right\}\begin{pmatrix} d & -b \\ -b & a \end{pmatrix} +$$

$$\frac{1}{ad - b^2}\frac{\partial}{\partial d}\begin{pmatrix} d & -b \\ -b & a \end{pmatrix}$$

$$= \frac{-a}{(ad - b^2)^2}\begin{pmatrix} d & -b \\ -b & a \end{pmatrix} + \frac{1}{ad - b^2}\begin{pmatrix} 1 & 0 \\ 0 & 0 \end{pmatrix}$$

$$= \frac{\begin{pmatrix} 1 & 0 \\ 0 & 0 \end{pmatrix} - (\hat{P}_{11}[t \mid t-1] + r_1)}{\begin{pmatrix} \hat{P}_{11}[t \mid t-1] + r_{11} & \hat{P}_{12}[t \mid t-1] + r_{12} \\ \hat{P}_{12}[t \mid t-1] + r_{12} & \hat{P}_{22}[t \mid t-1] + r_{22} \end{pmatrix}^{-1}}{(\hat{P}_{11}[t \mid t-1] + r_{11})(\hat{P}_{22}[t \mid t-1] + r_{22}) - (\hat{P}_{12}[t \mid t-1] + r_{12})^2}$$

Therefore, from equations (32)-(36), we note that $$\frac{\partial}{\partial \mu}\hat{\omega}_\mu[t \mid t]$$

and $$\frac{\partial}{\partial \mu}\hat{x}_\mu[t \mid t]$$

can be expressed in terms of the predictive estimates $$\hat{\omega}_\mu[t \mid t-1], \hat{x}_\mu[t \mid t-1], \hat{P}_\mu[t \mid t-1],$$

and their partial derivatives with respect to the parameter μ, $$\frac{\partial}{\partial \mu}\hat{\omega}_\mu[t \mid t-1],$$

$$\frac{\partial}{\partial \mu}\hat{x}_\mu[t \mid t-1],$$

$$\frac{\partial}{\partial \mu}\hat{P}_\mu[t \mid t-1].$$

Now, the derivatives of the predictors can be expressed in terms of the derivatives of the estimators in accordance with (12) and (13). From (12) we have $$\frac{\partial}{\partial \mu}\begin{pmatrix} \hat{x}_\mu[t+1 \mid t] \\ \hat{\omega}_\mu[t+1 \mid t] \end{pmatrix} = \begin{pmatrix} \frac{\partial A(\hat{\omega}_\mu[t \mid t])}{\partial \mu}\hat{x}_\mu[t \mid t] + A(\hat{\omega}_\mu[t \mid t])\frac{\partial \hat{x}_\mu[t \mid t]}{\partial \mu} \\ \frac{\partial}{\partial \mu}\hat{\omega}_\mu[t \mid t] \end{pmatrix} \quad (37)$$

and from eqn. (7)

$$\frac{\partial A(\hat{\omega}[t \mid t])}{\partial \mu} = \begin{pmatrix} 0 & 0 & 0 & \beta T_S \frac{\partial \hat{\omega}[t \mid t]}{\partial \mu} \\ 0 & 0 & -\beta T_S \frac{\partial \hat{\omega}[t \mid t]}{\partial \mu} & 0 \\ 0 & 0 & 0 & -T_S \frac{\partial \hat{\omega}[t \mid t]}{\partial \mu} \\ 0 & 0 & T_S \frac{\partial \hat{\omega}[t \mid t]}{\partial \mu} & 0 \end{pmatrix}$$

Therefore, $$\frac{\partial}{\partial \mu}\hat{x}_\mu[t \mid t-1]$$

and $$\frac{\partial}{\partial \mu}\hat{\omega}_\mu[t \mid t-1]$$

can be obtained from the partial derivatives of the filtered estimate $$\frac{\partial}{\partial \mu}\hat{x}_\mu[t-1 \mid t-1]$$

and $$\frac{\partial}{\partial \mu}\hat{\omega}_\mu[t-1 \mid t-1].$$

As for the partial derivatives in matrix $$\frac{\partial}{\partial \mu}\hat{P}_\mu[t \mid t-1],$$

from eqn. (13) we can express them in terms of the partial derivatives of the filtered estimate.

$$\frac{\partial}{\partial \mu}\hat{P}_\mu[t+1 \mid t] = \frac{\partial\begin{pmatrix} A(\hat{\omega}[k]) & 0 \\ 0 & 1 \end{pmatrix}}{\partial \mu}\hat{P}_\mu[t \mid t]\begin{pmatrix} A(\hat{\omega}[k]) & 0 \\ 0 & 1 \end{pmatrix}^T + \quad (38)$$

$$\begin{pmatrix} A(\hat{\omega}[k]) & 0 \\ 0 & 1 \end{pmatrix}\frac{\partial \hat{P}_\mu[t \mid t]}{\partial \mu}\begin{pmatrix} A(\hat{\omega}[k]) & 0 \\ 0 & 1 \end{pmatrix}^T +$$

$$\begin{pmatrix} A(\hat{\omega}[k]) & 0 \\ 0 & 1 \end{pmatrix}\hat{P}_\mu[t \mid t]\frac{\partial\begin{pmatrix} A(\hat{\omega}[k]) & 0 \\ 0 & 1 \end{pmatrix}^T}{\partial \mu} + \frac{\partial Q}{\partial \mu}$$

and we have $$\frac{\partial}{\partial \mu}\begin{pmatrix} A(\hat{\omega}_\mu[t\,|\,t]) & 0 \\ 0 & 1 \end{pmatrix} = T_s \begin{pmatrix} 0 & 0 & 0 & \beta\frac{\partial \hat{\omega}_\mu[t\,|\,t]}{\partial \mu} & 0 \\ 0 & 0 & -\beta\frac{\partial \hat{\omega}_\mu[t\,|\,t]}{\partial \mu} & 0 & 0 \\ 0 & 0 & 0 & -\frac{\partial \hat{\omega}_\mu[t\,|\,t]}{\partial \mu} & 0 \\ 0 & 0 & \frac{\partial \hat{\omega}_\mu[t\,|\,t]}{\partial \mu} & 0 & 0 \\ 0 & 0 & 0 & 0 & 0 \end{pmatrix}$$

Thus, in computing $$\frac{\partial}{\partial \mu}\hat{\omega}_\mu[t\,|\,t]$$

from (32), all terms on the right-hand side other than the term y[t] can be obtained from values obtained in the EKF and the gradient computation at time t−1 upon receiving measurement y[t−1]. This is an interesting property because this property allows for a recursion that makes computation of (31) simple.

In exploring the values of system parameter to be used μ, in order to obtain the value of cost (μ) associated with a specific value of μ (e.g., $$\text{cost}(\mu) = \frac{1}{|\Omega|}\sum_{t\in\Omega}\{\hat{\omega}_\mu[t\,|\,t] - \omega^*[t]\}^q),$$

the numerical values of $\hat{\omega}_\mu[t|t]$ can be computed, simulated, or collected from actual or experimental physical system in the set, Ω, of time points in which the system uses the specific value of μ. Set Ω can be a set of consecutive time points.

II.C Gradient Computation

Methods of computing the gradient or a gradient-like quantity can be combined with any method of determining the system parameter values to be used. For example, for any method that uses the gradient, $$\nabla \text{cost}(\mu),$$

of a cost function cost(μ) or a gradient-like quantity for optimizing cost function cost(μ), methods of computing the gradient or a gradient-like quantity can be employed. The gradient comprises partial derivatives. This section presents methods of computing partial derivatives (e.g., equation (21), equation (31)) in more detail.

As an example, let us consider a function, $$c(\mu) = \lim_{T\to\infty}\frac{1}{T}\sum_{t=1}^{T}E[\{\hat{\omega}[t\,|\,t] - \omega^*[t]\}^2],$$

where $E[\{\hat{\omega}[t|t]-\omega^*[t]\}^2]$ denotes the expected value of $\{\hat{\omega}[t|t]-\omega^*[t]\}^2$, to guide the determination and update of the system parameter to be used. Value c(μ) that corresponds to a particular value of μ can be interpreted as the mean-square difference between the system's estimate, $\hat{\omega}[t|t]$, of the angular speed based on observations up to time t, and the reference angular speed ω*[t]. We note that the value of the estimate $\hat{\omega}[t|t]$, t=1, 2, . . . depends on the value of parameter μ used for this speed estimation (e.g., R and Q in the extended Kalman filter (10)-(13)). Determination and update of system parameters μ can be guided toward the value of μ that results in the smallest c(μ). The gradient or a gradient-related quantity associated with function c(μ) can be used in determining and updating a good value of μ to be used. As methods of realizing this general idea, the partial derivative $$\frac{\partial c}{\partial \mu}(\mu),$$

where μ denotes a component of vector parameter μ and $$\frac{\partial c}{\partial \mu}$$

denotes the partial derivative of function c with respective component μ, can be replaced by $$\frac{\partial \text{cost}}{\partial \mu} = \frac{\partial}{\partial \mu}\frac{1}{|\Omega|}\sum_{t\in\Omega}\{\hat{\omega}[t\,|\,t] - \omega^*[t]\}^2$$

$$= \frac{1}{|\Omega|}\sum_{t\in\Omega}2\{\hat{\omega}[t\,|\,t] - \omega^*[t]\}\frac{\partial \hat{\omega}[t\,|\,t]}{\partial \mu},$$

where Ω is a finite subset of discrete times points. As an example, let us consider Ω={1, 2, . . . , T}. The partial derivative $$\frac{\partial \hat{\omega}[t\,|\,t]}{\partial \mu}$$

can be computed recursively, as discussed in previous sections. For example, for the case of extended Kalman filter (10)-(13), in accordance with (32)-(38), partial derivative $$\frac{\partial \hat{\omega}[t\,|\,t]}{\partial \mu}$$

can be recursively computed by using $$\frac{\partial \hat{\omega}[t\,|\,t-1]}{\partial \mu}, \frac{\partial \hat{P}[t\,|\,t-1]}{\partial \mu}, \frac{\partial \hat{x}[t\,|\,t-1]}{\partial \mu}$$

and the values computed prior to obtaining measurement value at t such as ω[t|t−1], P̂[t|t−1]. Suppose that time t belongs to Ω. Then, in computing the partial derivative $$\frac{\partial \hat{\omega}[t\,|\,t]}{\partial \mu}$$

at the parameter vector point μ, the partial derivatives $$\frac{\partial \hat{\omega}[t|t-1]}{\partial \mu}, \frac{\partial \hat{P}[t|t-1]}{\partial \mu}, \frac{\partial \hat{x}[t|t-1]}{\partial \mu}$$

at μ and filter prediction $\hat{\omega}[t|t-1]$, $\hat{P}[t|t-1]$, $\hat{x}[t|t-1]$ resulting from parameter value μ can be used.

Partial derivatives $$\frac{\partial \hat{\omega}[t|t-1]}{\partial \mu}, \frac{\partial \hat{P}[t|t-1]}{\partial \mu}, \frac{\partial \hat{x}[t|t-1]}{\partial \mu}$$

can be expressed in terms of partial derivatives $$\frac{\partial \hat{\omega}[t-1|t-1]}{\partial \mu}, \frac{\partial \hat{P}[t-1|t-1]}{\partial \mu}, \frac{\partial \hat{x}[t-1|t-1]}{\partial \mu}$$

and the filter estimates $\hat{\omega}[t-1|t-1]$, $\hat{P}[t-1|t-1]$, $\hat{x}[t-1|t-1]$. Thus, in computing the partial derivative $$\frac{\partial \hat{\omega}[t|t]}{\partial \mu}$$

at the parameter vector point μ, the partial derivatives $$\frac{\partial \hat{\omega}[t-1|t-1]}{\partial \mu}, \frac{\partial \hat{P}[t-1|t-1]}{\partial \mu}, \frac{\partial \hat{x}[t-1|t-1]}{\partial \mu}$$

at μ and the filter estimation $\hat{\omega}[t-1|t-1]$, $\hat{P}[t-1|t-1]$, $\hat{x}[t-1|t-1]$ resulting from parameter value μ can be used.

As presented in previous sections and the present section, the partial derivatives and thus the gradients can be computed recursively. We here note that the partial derivatives at the initialization can be computed from the initial conditions of the system. For example, in the system (7)-(9) employing the extended Kalman filter (10)-(13), for t=1, 2, 3, . . . , in accordance with (10), we have $$\begin{pmatrix} \hat{x}[1|1] \\ \hat{\omega}[1|1] \end{pmatrix} = \begin{pmatrix} \hat{x}[1|0] \\ \hat{\omega}[1|0] \end{pmatrix} + \hat{P}[1|0]C^T (C\hat{P}[1|0]C^T + R)^{-1}$$

$$\left\{ y[t] - C \begin{pmatrix} \hat{x}[1|0] \\ \hat{\omega}[1|0] \end{pmatrix} \right\}$$

$$= \begin{pmatrix} \hat{x}[1|0] \\ \hat{\omega}[1|0] \end{pmatrix} + \hat{P}[1|0]C^T \begin{pmatrix} a & b \\ b & d \end{pmatrix}^{-1} \left\{ y[t] - \begin{pmatrix} \hat{x}_1[1|0] \\ \hat{x}_2[1|0] \end{pmatrix} \right\}$$

and accordingly $$\frac{\partial}{\partial \mu} \begin{pmatrix} \hat{x}[1|1] \\ \hat{\omega}[1|1] \end{pmatrix} = \frac{\partial}{\partial \mu} \begin{pmatrix} \hat{x}[1|0] \\ \hat{\omega}[1|0] \end{pmatrix} +$$

$$\left\{ \frac{\partial}{\partial \mu} \hat{P}[1|0] \right\} C^T (C\hat{P}[1|0]C^T + R)^{-1} \left\{ y[t] - C \begin{pmatrix} \hat{x}[1|0] \\ \hat{\omega}[1|0] \end{pmatrix} \right\} +$$

-continued $$\hat{P}[1|0]C^T \left\{ \frac{\partial}{\partial \mu} (C\hat{P}[1|0]C^T + R)^{-1} \right\} \left\{ y[t] - C \begin{pmatrix} \hat{x}[1|0] \\ \hat{\omega}[1|0] \end{pmatrix} \right\} +$$

$$\hat{P}[1|0]C^T (C\hat{P}[1|0]C^T + R)^{-1} \frac{\partial}{\partial \mu} \left\{ y[t] - C \begin{pmatrix} \hat{x}[1|0] \\ \hat{\omega}[1|0] \end{pmatrix} \right\}$$

If the numerical values of partial derivatives at time 0, $$\frac{\partial}{\partial \mu} \begin{pmatrix} \hat{x}[1|0] \\ \hat{\omega}[1|0] \end{pmatrix}, \left\{ \frac{\partial}{\partial \mu} \hat{P}[1|0] \right\}$$

are not available, $$\frac{\partial}{\partial \mu} \begin{pmatrix} \hat{x}[1|1] \\ \hat{\omega}[1|1] \end{pmatrix} = \hat{P}[1|0]C^T \left\{ \frac{\partial}{\partial \mu} (C\hat{P}[1|0]C^T + R)^{-1} \right\} \left\{ y[t] - C \begin{pmatrix} \hat{x}[1|0] \\ \hat{\omega}[1|0] \end{pmatrix} \right\}$$

can be used as the initialization for the recursive computation of the partial derivatives for t=2,3,4, . . . . If some of initial values $\hat{x}[1|0]$, $\hat{\omega}[1|0]$ or $\hat{P}[1|0]$ is not available, then it can be included in the vector μ of system parameters. Or, an arbitrary feasible value (e.g., $\hat{x}[1|0]=0, \hat{\omega}[1|0]=0, \hat{P}[1|0]=I$ (identity matrix)) can be used. For a sufficiently large set Ω, accurate assessment of the partial derivative is expected even with an arbitrary initial value.

ILD Real-Time Adaptation of Parameter Values for Use

This section first notes that gradient computation can utilize the state estimation made for actual operation of the system. We can conceptually define sets of times, each indexed by the value of parameter vector used by the system for operation. For example, we can denote by $\Omega_{\mu^l}$ the set of time points at which the system uses parameter value $\mu^l$ for operation. An example of these sets of time points is $$\Omega_{\mu^1} = \{1, 2, \ldots, T_1\},$$

where for each time point t in $\Omega_{\mu^1}$, vector parameter value $\mu^1$ is used by the system for operation, $$\Omega_{\mu^2} = \{T_1+1, T_1+2, \ldots, T_1+T_2\},$$

where for each time point t in $\Omega_{\mu^2}$, vector parameter value $\mu^2$ is used by the system, $$\Omega_{\mu^3} = \{T_1+T_2+1, T_1+T_2+2, \ldots, T_1+T_2+T_3\},$$

where for each time point t in $\Omega_{\mu^3}$, vector parameter value $\mu^3$ is used by the system, . . . , $\Omega_{\mu^l} = \{T_1+T_2+\ldots+T_{l-1}+1, T_1+T_2+\ldots+T_{l-1}+2, \ldots, T_1+T_2+\ldots+T_{l-1}+T_l\}, \ldots$, etc. For example, in the case in which the extended Kalman filter (10)-(13) is used by the system, for t in $\Omega_{\mu^l}$, in computing $$\begin{pmatrix} \hat{x}[t|t] \\ \hat{\omega}[t|t] \end{pmatrix} \text{ and } \hat{P}[t|t]$$

in accordance with equation (10) and (11), the value of covariance matrix R in (10) is specified in the vector value $\mu^l$. Also, for example, for t in $\Omega_{\mu^l}$, in computing $$\begin{pmatrix} \hat{x}[t+1|t] \\ \hat{\omega}[t+1|t] \end{pmatrix} \text{ and } \hat{P}[t+1|t]$$

in accordance with equation (12) and (13), the value of covariance matrix Q in (13) is specified in the vector value $\mu^l$. At the end of the latest time in set $\Omega_{\mu^l}$ (in this example, at the end to time $T_1+T_2+\ldots+T_{l-1}+T_l$), in computing partial derivative $$\frac{\partial \text{cost}}{\partial \mu}(\mu^l) = \frac{\partial}{\partial \mu} \frac{1}{|\Omega_{\mu^l}|} \sum_{t \in \Omega_{\mu^l}} \{\hat{\omega}[t \mid t] - \omega^*[t]\}^2 \qquad (50)$$

$$= \frac{1}{|\Omega_{\mu^l}|} \sum_{t \in \Omega_{\mu^l}} 2\{\hat{\omega}[t \mid t] - \omega^*[t]\} \frac{\partial \hat{\omega}[t \mid t]}{\partial \mu},$$

which can be viewed as an approximation to partial derivative $$\frac{\partial c}{\partial \mu}$$

at $\mu^l$, the set of estimation results (e.g. from an extended Kalman filter) from the actual operation $$\{\hat{\omega}[t \mid t] \mid t \in \Omega_{\mu^l}\} \qquad (51)$$

can be used. As presented in the previous sections, this computation can be performed recursively. Readily available set of results (51) can contribute to computing partial derivatives and the gradient at $\mu^l$ quickly. The gradient can be used to improve the parameter value to be used for operation. For example, the value $\mu^l$ can be updated to $$\mu^{l+1} = [\mu^l - \alpha^l \nabla \text{cost}(\mu^l)]^+, \qquad (52)$$

for some scalar step size $\alpha^l$, where $[\ ]^+$ denotes adjustment onto the feasible set of parameter vector. For example, in the case of the induction motor model (5)-(9), $[\ ]^+$ can be a projection onto the positive orthant. The new system parameter value $\mu^{l+1}$ can be used for system operation after time $T_1+T_2+\ldots+T_{l-1}+T_l$ until some time, say $T_1+T_2+\ldots+T_l+T_{l+1}$.

We also note that, while the system makes improvement of values, $\ldots, \mu^l, \mu^{l+1}$, based on the filter values from actual operation $\{\hat{\omega}[t \mid t] \mid t \in \Omega_{\mu^l}\}$, l=1,2, ..., such as according to (52), longer-term explorations for the best value of $\mu$ can be performed in parallel by method (10). Or, the longer-term exploration can be performed by an evolutionary algorithm that skips block (21).

III. Online State Estimation and Individually Estimating Covariance of Process and Measurement Noise We denote by P[0|−1] the covariance, $$E\left\{\begin{pmatrix} x[0] \\ \omega[0] \end{pmatrix}\begin{pmatrix} x[0] \\ \omega[0] \end{pmatrix}^T\right\} - E\begin{pmatrix} x[0] \\ \omega[0] \end{pmatrix} E\begin{pmatrix} x[0] \\ \omega[0] \end{pmatrix}^T \qquad (3.10)$$

of the system state at time 0, prior to having the measurement of Y[0]. We denote by $\hat{x}[0|-1]$ and $\hat{\omega}[0|-1]$, respectively, the estimates of state variables x[0] and $\omega$[0] prior to having the measurement of Y[0]. If some of the expected values E(x[0]), E($\omega$[0]) are available, they can be used for initializing $\hat{x}[0|-1]$ and/or $\hat{\omega}[0|-1]$; for example, $\hat{x}[0|-1]$ can be set to E(x[0]), and $\hat{\omega}[0|-1]$ can be set to E($\omega$[0]). The system state at discrete-time 0 can be interpreted as the system state at the end of previous period of operation. Then, $\hat{x}[0|-1]$ and $\hat{\omega}[0|-1]$ can be interpreted as the estimation of the system state at the end of previous period of system operation. Another possibility is to set $\hat{x}[0|-1]$ and $\hat{\omega}[0|-1]$ to the nominal state values of x[0] and $\omega$[0] at discrete time 0 (in accordance with the reference signal, for example). We denote by $\hat{x}[t|\tau]$ the estimate of the partial state x[t] at discrete time t on the basis of the measurements y[0], y[1], ..., y[2] up to discrete time $\tau$. Likewise, we denote by w[t|$\tau$] the estimate of the partial state w[t] at discrete time t on the basis of the measurements y[0],y[1], ..., y[$\tau$] up to discrete time $\tau$. We denote by $\hat{P}[t|\tau]$ a matrix variable that an algorithm or a method may maintain in association with the covariance matrix of state variable $$\begin{pmatrix} x[t] \\ \omega[t] \end{pmatrix}$$

a posteriori to measurements y[0],y[1], ..., y[$\tau$]. $\hat{P}[t|\tau]$ may be interpreted as an approximation to the covariance of the system state $$\begin{pmatrix} x[t] \\ \omega[t] \end{pmatrix}$$

conditional on observations y[0],y[1], ..., y[$\tau$]. P[0|−1] can be interpreted as the a priori estimate of covariance P[0|−1], which is the estimate before the first measurement of Y[0]. If the system state at discrete-time 0 is interpreted as the system state at the end of previous period of system operation, then $\hat{P}[0|-1]$ can be interpreted as the estimation of the covariance of the system state at the end of previous period of system operation. If there is no previous operation that provides the estimation of the covariance of the system state, the value of $\hat{P}[0|-1]$ can be set based on the nature of randomness in the initial state of the system—e.g. the covariance matrix of the initial state variables.

Suppose that covariance matrices Q and R are known. Then, the extended Kalman filter [2] idea can be applied to the dynamic system model (7) and (8) in order to estimate and track the system state $$\begin{pmatrix} x[t] \\ \omega[t] \end{pmatrix},$$

in response to new measurements y[t]. At any discrete time t, in response to new measurements Y[t]=y[t], the state estimation can be updated as the following:

$$\begin{pmatrix} \hat{x}[t \mid t] \\ \hat{\omega}[t \mid t] \end{pmatrix} = \begin{pmatrix} \hat{x}[t \mid t-1] \\ \hat{\omega}[t \mid t-1] \end{pmatrix} + \qquad (3.11)$$

$$\hat{P}[t \mid t-1]C^T(C\hat{P}[t \mid t-1]C^T + R)^{-1}\left\{y[t] - C\begin{pmatrix} \hat{x}[t \mid t-1] \\ \hat{\omega}[t \mid t-1] \end{pmatrix}\right\}$$

Covariance-related variable is updated as the following:

$$\hat{P}[t|t] = \hat{P}[t|t-1] - \hat{P}[t|t-1]C^T(C\hat{P}[t|t-1]C^T+R)^{-1}$$
$$C\hat{P}[t|t-1] \qquad (3.12)$$

Then, the following prediction cycle can be applied:

$$\begin{pmatrix} \hat{x}[t+1|t] \\ \hat{\omega}[t+1|t] \end{pmatrix} = \begin{pmatrix} A(\hat{\omega}[t|t])\hat{x}[t|t] \\ \hat{\omega}[t|t] \end{pmatrix} + Bu[t] \quad (3.13)$$

$$\hat{P}[t+1|t] = \begin{pmatrix} A(\hat{\omega}[t|t]) & 0 \\ 0 & 1 \end{pmatrix} \hat{P}[t|t] \begin{pmatrix} A(\hat{\omega}[t|t]) & 0 \\ 0 & 1 \end{pmatrix}^T + Q \quad (3.14)$$

The update and prediction cycle in (3.11)-(3.14) requires the value of covariance matrices Q and R. The methods to be presented in the next few sections use estimates of covariance matrices Q and R, and this document also includes methods to determine and update the estimates of Q and R in response to incoming measurements for the purpose of improving the estimates and also for the purpose of tracking the true values of Q and R if they change over time.

III.A Estimation of R, the Measurement Noise Covariance
<Initial Estimation of R without Knowledge of Q>
This document notes that the matrix $CP[0|-1]C^T+R$, which is denoted as $\Xi[0|-1]$ in this document, can be estimated on the basis of measurements by the maximum likelihood (ML) [3] estimation. For example, after the measurement of $Y[0]=y[0]$, as a method of estimating $CP[0|-1]C^T+R=\Xi[0|-1]$, an estimate $$\hat{\Xi}[0|-1] = \left\{ y[0] - C\begin{pmatrix} \hat{x}[0|-1] \\ \hat{\omega}[0|-1] \end{pmatrix} \right\} \left\{ y[0] - C\begin{pmatrix} \hat{x}[0|-1] \\ \hat{\omega}[0|-1] \end{pmatrix} \right\}^T \quad (3.15)$$

can be used. The basic idea behind this estimator (3.15) is the maximum likelihood estimation. Under the assumption of jointly Gaussian x[0], ω[0],Z[0], measurement Y[0] has Gaussian probability distribution with mean $(E(x[0]),E(\omega[0]))^T$, and covariance $CP[0|-1]C^T+R=\Xi[0|-1]$.
The Gaussian probability density function (pdf) of random vector Y[0] evaluated at $Y[0]=y[0]$ is maximized over all possible non-negative definite matrix $\Xi[0|-1]$ if the value of $\Xi[0|-1]$ is $$\left\{ y[0] - C\begin{pmatrix} E(x[0]) \\ E(\omega[0]) \end{pmatrix} \right\} \left\{ y[0] - C\begin{pmatrix} E(x[0]) \\ E(\omega[0]) \end{pmatrix} \right\}^T. \quad (3.16)$$

Expression (3.16) can be approximated by (3.15). Estimation of R can be simply derived from (3.15) if an estimate of P[0|-1] is available. For example, if the estimate of P[0|-1] is $\hat{P}[0|-1]$, then the estimate, $\hat{R}[0|0]$, of R can be evaluated as $$\hat{R}[0|0] = \quad (3.17)$$
$$\left\{ y[0] - C\begin{pmatrix} \hat{x}[0|-1] \\ \hat{\omega}[0|-1] \end{pmatrix} \right\} \left\{ y[0] - C\begin{pmatrix} \hat{x}[0|-1] \\ \hat{\omega}[0|-1] \end{pmatrix} \right\}^T - C\hat{P}[0|-1]C^T.$$

$\hat{P}[0|-1]$ can be interpreted as the a priori estimate of covariance $P[0|-1]$, which is the estimate before measurement of Y[0]. If the system state at discrete-time 0 is interpreted as the system state at the end of previous period of operation, then $\hat{P}[0|-1]$ can be interpreted as the estimation of the covariance of the system state at the end of previous period of system operation.

The same maximum likelihood estimation principle or other methods can be used for improving the estimation of R, based on further availability of measurements y[0],y[1], y[2], <Continual Estimation of R for a Given Value of Q>
Measurement $$Y[k] = C\begin{pmatrix} x[k] \\ \omega[k] \end{pmatrix} + Z[k]$$

at discrete-time k contains information about measurement noise Z[k]. In the case in which the system state $$\begin{pmatrix} x[k] \\ \omega[k] \end{pmatrix}$$

and $$Z[k]$$

are statistically independent Gaussian random vectors, the measurement Y[k] is a Gaussian random vector. Conditional on measurements $Y[0]=y[0],Y[1]=y[1], \ldots ,Y[k-1]=y[k-1]$, the expected value of the system state $$\begin{pmatrix} x[k] \\ \omega[k] \end{pmatrix}$$

can be estimated as $$\begin{pmatrix} \hat{x}[k|k-1] \\ \hat{\omega}[k|k-1] \end{pmatrix},$$

and the covariance of the state can be estimated as $\hat{P}[k|k-1]$. Measurement Y[k]'s expected value can be approximated by $$C\begin{pmatrix} \hat{x}[k|k-1] \\ \hat{\omega}[k|k-1] \end{pmatrix},$$

and its covariance matrix can be approximated by $C\hat{P}[k|k-1]C^T+R[k]$, where R[k] here denotes the covariance matrix of Z[k].

$$\text{cov}\begin{pmatrix} x[k] \\ \omega[k] \end{pmatrix}$$

denoting the covariance matrix of $$\begin{pmatrix} x[k] \\ \omega[k] \end{pmatrix},$$

the maximum likelihood estimation of $$C\left[\text{COV}\begin{pmatrix} x[k] \\ \omega[k] \end{pmatrix}\right]C^T + R[k]$$

based on additional measurement Y[k]=y[k] can be approximated by $$\left\{y[k] - C\begin{pmatrix} \hat{x}[k \mid k-1] \\ \hat{\omega}[k \mid k-1] \end{pmatrix}\right\}\left\{y[k] - C\begin{pmatrix} \hat{x}[k \mid k-1] \\ \hat{\omega}[k \mid k-1] \end{pmatrix}\right\}^T \quad (3.18)$$

Accordingly, the maximum likelihood estimation of R[k] based on additional measurement Y[k]=y[k] can be approximated by $$\left\{y[k] - C\begin{pmatrix} \hat{x}[k \mid k-1] \\ \hat{\omega}[k \mid k-1] \end{pmatrix}\right\}\left\{y[k] - C\begin{pmatrix} \hat{x}[k \mid k-1] \\ \hat{\omega}[k \mid k-1] \end{pmatrix}\right\}^T - \quad (3.19)$$
$$C\hat{P}[k \mid k-1]C^T$$

With this method, the estimate of the measurement noise covariance R can be re-evaluated at each new measurement. Also, in estimating R in response to new measurements Y[k]=y[k], the estimation of R made based on other measurements Y[m]=y[m],m= . . . ,k−1,k+1, . . . can be taken into consideration, even in the case of online estimation as well as offline estimation. For example, a weighted linear combination (weighted average) of (3.19) and past estimations of R can be used as a current estimate of R in online estimation. For example, denoting $$\lambda[k] \equiv \left\{y[k] - C\begin{pmatrix} \hat{x}[k \mid k-1] \\ \hat{\omega}[k \mid k-1] \end{pmatrix}\right\}\left\{y[k] - C\begin{pmatrix} \hat{x}[k \mid k-1] \\ \hat{\omega}[k \mid k-1] \end{pmatrix}\right\}^T - \quad (3.20)$$
$$C\hat{P}[k \mid k-1]C^T$$

for each k, an example estimate of R based on the set of measurements Y[0]=y[0],Y[1]=y[1], . . . , Y[k−1],Y[k], in an online method is $$\hat{R}[k \mid k] = \frac{\sum_{\tau=0}^{L-1} \rho^\tau \lambda[k-\tau]}{\sum_{\tau=0}^{L} \rho^\tau} \quad (3.21)$$

for some positive integer L and 0<ρ<1.

III.B Estimating Q Through Smoothing for a Given Value of R

This section presents methods of estimating Q for a given value of R. It is to be noted that the given value of can be an estimated value, $\hat{R}$, obtained from methods presented in section III.A. At any discrete-time N, from measurements accumulated up to time N, the maximum likelihood estimation of Q can be considered. Suppose we applied a known control sequence u[0], . . . ,u[N−1], which we denote as $u_0^{N-1}$. We can consider the ML estimation of Q based on observations Y[0]=y[0], . . . ,Y[N−1]=y[N−1],Y[N]=y[N], which we denote as $Y_0^N = y_0^N$. For a known sequence of inputs control, ML estimation of Q is:

$$\arg\max_Q p_Q(y_0^N) \quad (3.22)$$

where $p_Q(y_0^N)$ in (3.22) denotes the joint probability density function of Y[0], . . . ,Y[N−1],y[N−1] parametrized by process noise covariance Q. In order to avoid computational difficulties [4] of this ML estimation, we consider applying the idea of Expectation Maximization (EM) [4] algorithm. Suppose the data, which are denoted as $X_0^N$, and $\omega_0^N$, of realized system states x[i],ω[i],i=0,1,2, . . . ,N were available, as well as the data, $y_0^N$, of the realized measurements Y[0]=y[0], . . . ,Y[N−1]=y[N−1],Y[N]=y[N]. Then, the maximum likelihood estimation of Q from data $y_0^N$, $x_0^N$, $\omega_0^N$ would be $$\arg\max_Q p_Q(y_0^N, x_0^N, \omega_0^N) \quad (3.23)$$

The joint probability density function, $p_Q(y_0^N, x_0^N, \omega_0^N)$, of measurements Y[0], Y[1], . . . , Y[N−1],y[N] and system states $$\begin{pmatrix} x[k] \\ \omega[k] \end{pmatrix},$$
$$k = 0, 1, 2, \ldots, N$$

has the following structure:

$$p_Q(y_0^N, x_0^N, \omega_0^N) = p(y[0], x[0], \omega[0]) \quad (3.24)$$
$$\prod_{i=1}^{N} p(y[i] \mid x[i], \omega[i]) p_Q(x[i], \omega[i] \mid x[i-1], \omega[i-1]),$$

where p (y[0],x[0],ω[0]) in (3.24) denotes the joint probability density function of Y[0] and system state $$\begin{pmatrix} x[0] \\ \omega[0] \end{pmatrix};$$

p(y[i]| x[i],ω[i]) denotes the joint probability density function of measurement Y[i] conditioned on the state $$\begin{pmatrix} x[i] \\ \omega[i] \end{pmatrix};$$

$p_Q(x[i],w[i]|$ x[i−1],w[i−1]) denotes the joint probability density function of the system state at time i, $$\begin{pmatrix} x[i] \\ \omega[i] \end{pmatrix},$$

conditioned on the system state at time i−1, $$\begin{pmatrix} x[i-1] \\ \omega[i-1] \end{pmatrix}.$$

It should be noted that probability density functions p (y[0],x[0],ω[0]) and p(y[i]| x[i],ω[i]) for each i do not depend on parameter Q. Thus, from (3.24) we have $$\text{argmax}_Q \, p_Q(y_0^N, x_0^N, \omega_0^N) = \quad (3.25)$$

$$\text{argmax}_Q \prod_{i=1}^{N} p_Q(x[i], \omega[i] \mid x[i-1], \omega[i-1])$$

where $\text{argmax}_Q p_Q(y_0^N, x_0^N, \omega_0^N)$ denotes the matrix value of Q that maximizes function value $p_Q(y_0^N, x_0^N, \omega_0^N)$, which is evaluated at measurement and state realization $y_0^N, x_0^N, \omega_0^N$. Due to the monotonically increasing property of the natural log, we have $$\text{argmax}_Q \prod_{i=1}^{N} p_Q(x[i], \omega[i] \mid x[i-1], \omega[i-1]) = \quad (3.26)$$

$$\text{argmax}_Q \sum_{i=1}^{N} \ln p_Q(x[i], \omega[i] \mid x[i-1], \omega[i-1])$$

Under the assumption of Gaussian noise process, from equations (7), (3.25), (3.26), we have $$\text{argmax}_Q \, p_Q(y_0^N, x_0^N, \omega_0^N) = \quad (3.27)$$

$$\text{argmax}_Q \begin{bmatrix} -\frac{1}{2} \sum_{i=1}^{N} \ln \det Q \\ -\frac{1}{2} \sum_{i=1}^{N} \left\{ \begin{pmatrix} x[i] \\ \omega[i] \end{pmatrix} - \begin{pmatrix} A(\omega[i-1]) & 0 \\ 0 & 1 \end{pmatrix} \begin{pmatrix} x[i-1] \\ \omega[i-1] \end{pmatrix} - Bu[i-1] \right\}^T \cdot \\ Q^{-1} \cdot \left\{ \begin{pmatrix} x[i] \\ \omega[i] \end{pmatrix} - \begin{pmatrix} A(\omega[i-1]) & 0 \\ 0 & 1 \end{pmatrix} \begin{pmatrix} x[i-1] \\ \omega[i-1] \end{pmatrix} - Bu[i-1] \right\} \end{bmatrix}$$

where det Q denotes the determinant of matrix Q. Seeking the maximizing Q in (3.27) is equivalent to seeking the minimizing Q for a function of opposite polarity, which is denoted as $$\text{argmin}_Q \begin{bmatrix} N \ln \det Q + \\ \sum_{i=1}^{N} \left\{ \begin{pmatrix} x[i] \\ \omega[i] \end{pmatrix} - \begin{pmatrix} A(\omega[i-1]) & 0 \\ 0 & 1 \end{pmatrix} \begin{pmatrix} x[i-1] \\ \omega[i-1] \end{pmatrix} - Bu[i-1] \right\}^T \cdot \\ Q^{-1} \cdot \left\{ \begin{pmatrix} x[i] \\ \omega[i] \end{pmatrix} - \begin{pmatrix} A(\omega[i-1]) & 0 \\ 0 & 1 \end{pmatrix} \begin{pmatrix} x[i-1] \\ \omega[i-1] \end{pmatrix} - Bu[i-1] \right\} \end{bmatrix} \quad (3.28)$$

For simplicity of description, we denote $$\mathcal{X}[i] = \begin{pmatrix} x[i] \\ \omega[i] \end{pmatrix} - \begin{pmatrix} A(\omega[i-1]) & 0 \\ 0 & 1 \end{pmatrix} \begin{pmatrix} x[i-1] \\ \omega[i-1] \end{pmatrix} - Bu[i-1] \quad (3.29)$$

$$= \begin{pmatrix} x[i] \\ \omega[i] \end{pmatrix} - \begin{pmatrix} A(\omega[i-1])x[i-1] \\ \omega[i-1] \end{pmatrix} - Bu[i-1]$$

Then, minimizer (3.28) can be expressed as $$\text{argmin}_Q \left( N \ln \det Q + \sum_{i=1}^{N} \mathcal{X}[i]^T Q^{-1} \mathcal{X}[i] \right) = \quad (3.30)$$

$$\text{argmin}_Q \left( N \ln \det Q + tr\left( Q^{-1} \sum_{i=1}^{N} \mathcal{X}[i] \mathcal{X}[i]^T \right) \right)$$

where $$tr\left( Q^{-1} \sum_{i=1}^{N} \mathcal{X}[i] \mathcal{X}[i]^T \right)$$

denoted the trace of the matrix $$Q^{-1} \sum_{i=1}^{N} \mathcal{X}[i] \mathcal{X}[i]^T.$$

The minimizer in (3.30) is $$\text{argmin}_Q \left\{ N \ln \det Q + tr\left( Q^{-1} \sum_{i=1}^{N} \mathcal{X}[i] \mathcal{X}[i]^T \right) \right\} = \left( \frac{1}{N} \right) \sum_{i=1}^{N} \mathcal{X}[i] \mathcal{X}[i]^T \quad (3.31)$$

Therefore, (3.31) would be the maximum likelihood estimation of Q from data $y_0^N, x_0^N, \omega_0^N$. It should be noted from (3.31) and system dynamics (7) that the statistics of random signal χ[i],i=0,1,2, . . . depends on the process noise covariance Q. However, the realized values of system states x[i],ω[i],i=0,1,2, . . . ,N are not available. Only the measurement data Y[0]=y[0], . . . ,Y[N−1]=y[N−1],Y[N]=y[N] are available at discrete time N. Thus, the realized data of random signal λ[i],i=0,1,2, . . . are not available. Although the realized data of random signal χ[i],i=0,1,2, . . . are not available, from (3.30) and (3.31) iterative methods of estimating Q can be derived. For example, one iterative method is to obtain a new estimate, $\hat{Q}_{l+1}$, of Q from a current estimate, $\hat{Q}_l$ of Q by the following:

$$\hat{Q}_{l+1} = \left( \frac{1}{N} \right) \sum_{i=1}^{N} E(\mathcal{X}[i] \mathcal{X}[i]^T \mid \hat{Q}_l, Y_0^N = y_0^N) \quad (3.32)$$

where the second-order statistics of $X[i], i=0,1,2,\ldots,N$ in (3.32) is conditional on the realization of random variables $Y[0]=y[0],\ldots,Y[N-1]=y[N-1],Y[N]=y[N]$ and under the assumption that the covariance of the process noise is $\hat{Q}_l$. Expression (3.32) is equivalent to $$\hat{Q}_{l+1} = \mathrm{argmin}_Q \left[ N\ln\det Q + tr\left\{ Q^{-1} \sum_{i=1}^{N} E(X[i]X[i]^T \mid \hat{Q}_l, Y_0^N = y_0^N) \right\} \right] \quad (3.33)$$

From the definition of argmin in (3.33), we have $$N\ln\det\hat{Q}_{l+1} + tr\left\{ \hat{Q}_{l+1}^{-1} \sum_{i=1}^{N} E(X[i]X[i]^T \mid \hat{Q}_l, Y_0^N = y_0^N) \right\} \leq \quad (3.34)$$

$$N\ln\det\hat{Q}_l + tr\left\{ \hat{Q}_l^{-1} \sum_{i=1}^{N} E(X[i]X[i]^T \mid \hat{Q}_l, Y_0^N = y_0^N) \right\}$$

It can be mathematically proven that in iteration (3.32) or (3.33)

$$P_{\hat{Q}_{l+1}}(y_0^N) \leq P_{\hat{Q}_l}(y_0^N) \quad (3.35)$$

Inequality (3.35) shows each step in iteration (3.34) produces a new estimate that is no worse than the previous estimate toward the goal of the maximum likelihood estimation $\mathrm{arg\,max}_Q p_Q(y_0^N)$.

It can be also proven that strict inequality in (3.35) (improvement of estimation) is achieved if strict inequality in (3.34) is achieved.

Iteration (3.32) can run multiple times to improve the estimate of Q for the same set of measurements, $y_0^N$. Iteration (3.32) can be designed to intertwine the steps of improving the estimate of Q for the same measurements $y_0^N$ with the steps of responding to a new measurement. For example, after running iteration (3.32) or (3.33) k times for some number k, the next update can respond to new measurements $Y[N+1]=y[N+1]$ as follows:

$$\hat{Q}_{l+k+1} = \mathrm{argmin}_Q \left[ (N+1)\ln\det Q + \right. \quad (3.36)$$

$$\left. tr\left\{ Q^{-1} \sum_{i=1}^{N+1} E(X[i]X[i]^T \mid \hat{Q}_{l+k}, Y_0^{N+1} = y_0^{N+1}) \right\} \right] =$$

$$\frac{1}{N+1} \sum_{i=1}^{N+1} E(X[i]X[i]^T \mid \hat{Q}_{l+k}, Y_0^{N+1} = y_0^{N+1})$$

Iteration (3.32), (3.33) requires computation of $E(\chi[i]\chi[i]^T \mid \hat{Q}_l, Y_0^N = y_0^N)$ for $i=1,2,\ldots,N$. As the discrete-time N increases, the amount of computation for (3.32) can become too large. A method of updating the estimate of Q with reduced amount of computation is to average over a selected subset of the following set $$\{E(\chi[i]\chi[i]^T \mid \hat{Q}_l, Y_0^N = y_0^N) \mid i=1,2,\ldots,N\}. \quad (3.37)$$

For example, in place of (3.32) one can use $$\hat{Q}_{l+1} = \left(\frac{1}{K}\right) \sum_{i=N-K+1}^{N} E(X[i]X[i]^T \mid \hat{Q}_l, Y_0^N = y_0^N) \quad (3.38)$$

for some value K. Method (38) contributes to tracking time-varying Q, if Q is time-varying, as well as reducing the amount of computation. For another example, a weighted average over a subset of $\{E(\chi[i]\chi[i]^T \mid \hat{Q}_l, Y_0^N = y_0^N) \mid i=1, 2,\ldots,N\}$ can be used as the estimate of Q.

<Methods of Evaluating $E(\chi[i]\chi[i]^T \mid \hat{Q}_l, Y_0^N = y_0^N)$>

This section presents methods of evaluating $$E(\chi[i]\chi[i]^T \mid \hat{Q}_l, Y_0^N = y_0^N)$$

which can be used for iteration (3.32), (3.33), (3.36) and (3.38). For $i<N$, computing $E(\chi[i]\chi[i]^T \mid \hat{Q}_l, Y_0^N = y_0^N)$ can be considered as a smoothing [5] operation. Thus, for $i<N$, $E(\chi[i]\chi[i]^T \mid \hat{Q}_l, Y_0^N = y_0^N)$ can be computed by running a smoothing algorithm under the assumption that the process noise covariance matrix Q is $\hat{Q}_l$ and under the current observation noise covariance estimate. For example, the extended Kalman smoothing [6] idea can be applied for that purpose. First, it is noted that $$E[\chi[i]\chi[i]^T \mid \hat{Q}_l, Y_0^N = y_0^N] = E[\{\chi[i] - E(\chi[i] \mid \hat{Q}_l, Y_0^N = y_0^N)\}\{\chi[i] - E(\chi[i] \mid \hat{Q}_l, Y_0^N = y_0^N)\}^T \mid \hat{Q}_l, Y_0^N = y_0^N] + E(\chi[i] \mid \hat{Q}_l, Y_0^N = y_0^N)E(\chi[i] \mid \hat{Q}_l, Y_0^N = y_0^N)^T \quad (3.39)$$

For reducing computation, the following approximation can be used:

$$X[i] \approx \begin{pmatrix} x[i] \\ \omega[i] \end{pmatrix} - \begin{pmatrix} A(\hat{\omega}^S[i-1 \mid N]) & 0 \\ 0 & 1 \end{pmatrix} \begin{pmatrix} x[i-1] \\ \omega[i-1] \end{pmatrix} - Bu[i-1], \quad (3.40)$$

where $\hat{\omega}^S[i-1 \mid N]$ is an a posteriori estimation of state variable $\omega[i-1]$ after knowing the realized measurement values $Y_0^N = y_0^N$. Another method is to use the following approximation:

$$X[i] \approx \begin{pmatrix} x[i] \\ \omega[i] \end{pmatrix} - \begin{pmatrix} A(\hat{\omega}[i-1 \mid i-1]) & 0 \\ 0 & 1 \end{pmatrix} \begin{pmatrix} x[i-1] \\ \omega[i-1] \end{pmatrix} - Bu[i-1], \quad (3.41)$$

where $\omega[i-1 \mid i-1]$ is an a posteriori estimation of state variable $\omega[i-1]$ after knowing the realized measurement values $Y_0^{i-1} = y_0^{i-1}$ and can be obtained from iterations (3.11)-(3.14). With such an approximation, the approximate value of $E(\chi[i]\chi[i]^T \mid \hat{Q}_l, Y_0^N = y_0^N)$ in (3.39) can be approximately evaluated from the output of the extended Kalman smoothing [6]. For example, $E(\chi[i] \mid \hat{Q}_l, Y_0^N = y_0^N)$ in (3.39) can be approximately evaluated from the output of the extended Kalman smoothing, $$\begin{pmatrix} \hat{x}^S[i \mid N] \\ \hat{\omega}^S[i \mid N] \end{pmatrix} - \begin{pmatrix} A(\hat{\omega}^S[i-1 \mid N]) & 0 \\ 0 & 1 \end{pmatrix} \begin{pmatrix} \hat{x}^S[i-1 \mid N] \\ \hat{\omega}^S[i-1 \mid N] \end{pmatrix} - Bu[i-1], \quad (3.42)$$

where $$\begin{pmatrix} \hat{x}^S[i \mid N] \\ \hat{\omega}^S[i \mid N] \end{pmatrix} \text{ and } \begin{pmatrix} \hat{x}^S[i-1 \mid N] \\ \hat{\omega}^S[i-1 \mid N] \end{pmatrix}$$

denote part of the extended Kalman smoothing output that provides an a posteriori estimate of system states $$\begin{pmatrix} x[i] \\ \omega[i] \end{pmatrix} \text{ and } \begin{pmatrix} x[i-1] \\ \omega[i-1] \end{pmatrix},$$

respectively, after having the realized measurement values $Y_0^N = y_0^N$. Another method is to approximate $E(\chi[i]|\hat{Q}_l, Y_0^N = y_0^N)$ in (3.39) by $$\begin{pmatrix} \hat{x}^S[i|N] \\ \hat{\omega}^S[i|N] \end{pmatrix} - \begin{pmatrix} A(\hat{\omega}[i-1|i-1]) & 0 \\ 0 & 1 \end{pmatrix} \begin{pmatrix} \hat{x}^S[i-1|N] \\ \hat{\omega}^S[i-1|N] \end{pmatrix} - Bu[i-1] \quad (3.43)$$

Also, $E[\{\chi[i]-E(\chi[i]|\hat{Q}_l,Y_0^N=y_0^N)\}\{\chi[i]-E(\chi[i]|\hat{Q}_l,Y_0^N=y_0^N)\}^T|\hat{Q}_l,Y_0^N=y_0^N]$ in (3.39) can be approximately evaluated, under the specified value of $\hat{Q}_l$ and measurement noise covariance $R$, from the output of the extended Kalman smoothing [6], $\hat{P}^S[i|N]$, $\hat{P}^S[i-1|N]$, which denote the extended Kalman smoothing's approximation to the covariance matrix of $$\begin{pmatrix} x[i] \\ \omega[i] \end{pmatrix} \text{ and } \begin{pmatrix} x[i-1] \\ \omega[i-1] \end{pmatrix},$$

respectively, conditional on $Y_0^N=y_0^N$, and $\hat{P}^S[i,i-1|N]$, which denotes the extended Kalman smoothing's approximation to the cross-covariance between $$\begin{pmatrix} x[i] \\ \omega[i] \end{pmatrix} \text{ and } \begin{pmatrix} x[i-1] \\ \omega[i-1] \end{pmatrix}$$

conditional on $Y_0^N=y_0^N$. For example, $E[\{\chi[i]-E(\chi[i]|\hat{Q}_l,Y_0^N=y_0^N)\}\{\chi[i]-E(\chi[i]|\hat{Q}_l,Y_0^N=y_0^N)\}^T|\hat{Q}_l,Y_0^N=y_0^N]$ can be approximated by $$\hat{P}^S[i|N] + \quad (3.44)$$

$$\begin{pmatrix} A(\hat{\omega}[i-1|i-1]) & 0 \\ 0 & 1 \end{pmatrix} \hat{P}^S[i-1|N] \begin{pmatrix} A(\hat{\omega}[i-1|i-1]) & 0 \\ 0 & 1 \end{pmatrix}^T -$$

$$\hat{P}^S[i,i-1|N] \begin{pmatrix} A(\hat{\omega}[i-1|i-1]) & 0 \\ 0 & 1 \end{pmatrix}^T -$$

$$\begin{pmatrix} A(\hat{\omega}[i-1|i-1]) & 0 \\ 0 & 1 \end{pmatrix} \hat{P}^S[i-1,i|N]$$

III.C Estimating Q without Smoothing for a Current Estimate of R

This section presents methods of updating the estimates of Q without running the extended Kalman smoothing operation. A simple method of estimating Q, after obtaining measurements $Y_0^N=y_0^N$ is to average over a selected subset of the following set:

$$\left\{ \left\{ \begin{pmatrix} \hat{x}[i|i] \\ \hat{\omega}[i|i] \end{pmatrix} - \begin{pmatrix} A(\hat{\omega}[i-1|i-1]) & 0 \\ 0 & 1 \end{pmatrix} \begin{pmatrix} \hat{x}[i-1|i-1] \\ \hat{\omega}[i-1|i-1] \end{pmatrix} - Bu[i-1] \right\} \right. \\ \left. \left\{ \begin{pmatrix} \hat{x}[i|i] \\ \hat{\omega}[i|i] \end{pmatrix} - \begin{pmatrix} A(\hat{\omega}[i-1|i-1]) & 0 \\ 0 & 1 \end{pmatrix} \begin{pmatrix} \hat{x}[i-1|i-1] \\ \hat{\omega}[i-1|i-1] \end{pmatrix} - Bu[i-1] \right\}^T \right\}_{i=1,2,\ldots,N}, \quad (3.45)$$

where in this set (3.45) all estimates are based on the current value of Q and R. For example, one can use $$\left(\frac{1}{K}\right) \sum_{i=N-K+1}^{N} \left\{ \begin{pmatrix} \hat{x}[i|i] \\ \hat{\omega}[i|i] \end{pmatrix} - \right. \quad (3.46)$$

-continued $$\begin{pmatrix} A(\hat{\omega}[i-1|i-1]) & 0 \\ 0 & 1 \end{pmatrix} \begin{pmatrix} \hat{x}[i-1|i-1] \\ \hat{\omega}[i-1|i-1] \end{pmatrix} - Bu[i-1] \right\}$$

$$\left\{ \begin{pmatrix} \hat{x}[i|i] \\ \hat{\omega}[i|i] \end{pmatrix} - \begin{pmatrix} A(\hat{\omega}[i-1|i-1]) & 0 \\ 0 & 1 \end{pmatrix} \begin{pmatrix} \hat{x}[i-1|i-1] \\ \hat{\omega}[i-1|i-1] \end{pmatrix} - Bu[i-1] \right\}^T$$

for some value K. For another example, a weighted average over a subset of (3.45) can be used as the estimate of Q. An example of such a weighted average is $$\frac{1}{\sum_{\tau=0}^{L} \rho^\tau} \quad (3.47)$$

$$\sum_{i=0}^{L} \rho^i \left\{ \begin{pmatrix} \hat{x}[N-i|N-i] \\ \hat{\omega}[N-i|N-i] \end{pmatrix} - \begin{pmatrix} A(\hat{\omega}[N-i-1|N-i-1]) & 0 \\ 0 & 1 \end{pmatrix} \right.$$

$$\begin{pmatrix} \hat{x}[N-i-1|N-i-1] \\ \hat{\omega}[N-i-1|N-i-1] \end{pmatrix} - Bu[N-i-1] \right\} \cdot$$

$$\left\{ \begin{pmatrix} \hat{x}[N-i|N-i] \\ \hat{\omega}[N-i|N-i] \end{pmatrix} - \begin{pmatrix} A(\hat{\omega}[N-i-1|N-i-1]) & 0 \\ 0 & 1 \end{pmatrix} \right.$$

$$\begin{pmatrix} \hat{x}[N-i-1|N-i-1] \\ \hat{\omega}[N-i-1|N-i-1] \end{pmatrix} - Bu[N-i-1] \right\}^T$$

for some positive integer L and $0<\rho<1$. In these methods, the backward recursion of the extended Kalman filter is not required. The estimates $\hat{x}[i|i], \hat{\omega}[i|i]$ for each i are available from iteration (3.11)-(3.14), which is performed under the current estimate of Q and R at each time t.

III.D Estimating Q with a Small Number of Backward Recursion in Smoothing for a Current Estimate of R With available measurements $Y_0^N=y_0^N$, another method of updating the estimate of Q from $\hat{Q}_l$ is to average over a selected subset of the following set $$\{E(\chi[i]\chi[i]^T|\hat{Q}_l,Y_0^i=y_0^i)|i=1,2,\ldots,N\}. \quad (3.48)$$

For example, one can estimate Q as the following:

$$\hat{Q}_{l+1} = \left(\frac{1}{K}\right) \sum_{i=N-K+1}^{N} E(\chi[i]\chi[i]^T | \hat{Q}_l, Y_0^i = y_0^i) \quad (3.49)$$

for some value K. Method (3.49) differs from (3.38) in that no more than one backward smoothing of the system state is required.

$$E[\chi[i]\chi[i]^T|\hat{Q}_l,Y_0^i=y_0^i] = E[\{\chi[i]-E(\chi[i]|\hat{Q}_l,Y_0^i=y_0^i)\}\{\chi[i]-E(\chi[i]|\hat{Q}_l,Y_0^i=y_0^i)\}^T|\hat{Q}_l,Y_0^i=y_0^i] + E(\chi[i]|\hat{Q}_l,Y_0^i=y_0^i)E(\chi[i]|\hat{Q}_l,Y_0^i=y_0^i)^T \quad (3.50)$$

can be approximated from the results of ongoing iteration for state estimation (3.11)-(3.14), which is performed under the current estimate of Q and R at each time t, and only one step of backward recursion in Kalman smoothing. For example, the term $E(\chi[i]|\hat{Q}_I, Y_0^i = y_0^i)$ in (3.50) can be approximated by $$\begin{pmatrix} \hat{x}[i|i] \\ \hat{\omega}[i|i] \end{pmatrix} - \begin{pmatrix} A(\hat{\omega}^S[i-1|i]) & 0 \\ 0 & 1 \end{pmatrix} \begin{pmatrix} \hat{x}^S[i-1|i] \\ \hat{\omega}^S[i-1|i] \end{pmatrix} - Bu[i-1], \quad (3.51)$$

where $\hat{x}[i|i], \hat{\omega}[i|i]$ are obtained from iteration (11)-(14), and $\hat{x}^S[i-1|i], \hat{\omega}^S[i-1|i]$ can be obtained from one step of the backward recursion in smoothing based on measurements $Y_0^i = y_0^i$. Also, the term $E[\{\chi[i] - E(\chi[i]|\hat{Q}_I, Y_0^i = y_0^i)\}\{\chi[i] - E(\chi[i]|\hat{Q}_I, Y_0^i = y_0^i)\}^T | \hat{Q}_I, Y_0^i = y_0^i]$ can be approximated by $$\hat{P}[i|i] + \quad (3.52)$$

$$\begin{pmatrix} A(\hat{\omega}[i-1|i-1]) & 0 \\ 0 & 1 \end{pmatrix} \hat{P}^S[i-1|i] \begin{pmatrix} A(\hat{\omega}[i-1|i-1]) & 0 \\ 0 & 1 \end{pmatrix}^T -$$

$$\hat{P}^S[i, i-1|i] \begin{pmatrix} A(\hat{\omega}[i-1|i-1]) & 0 \\ 0 & 1 \end{pmatrix}^T -$$

$$\begin{pmatrix} A(\hat{\omega}[i-1|i-1]) & 0 \\ 0 & 1 \end{pmatrix} \hat{P}^S[i-1, i|i]$$

Another method is to approximate $$E[\{\chi[i] - E(\chi[i] | \hat{Q}_I, Y_0^i = y_0^i)\}$$
$$\{\chi[i] - E(\chi[i] | \hat{Q}_I, Y_0^i = y_0^i)\}^T | \hat{Q}_I, Y_0^i = y_0^i]$$

by $$\hat{P}[i|i] + \begin{pmatrix} A(\hat{\omega}^S[i-1|i]) & 0 \\ 0 & 1 \end{pmatrix} \hat{P}^S[i-1|i] \begin{pmatrix} A(\hat{\omega}^S[i-1|i]) & 0 \\ 0 & 1 \end{pmatrix}^T - \quad (3.53)$$

$$\hat{P}^S[i, i-1|i] \begin{pmatrix} A(\hat{\omega}^S[i-1|i]) & 0 \\ 0 & 1 \end{pmatrix}^T -$$

$$\begin{pmatrix} A(\hat{\omega}^S[i-1|i]) & 0 \\ 0 & 1 \end{pmatrix} \hat{P}^S[i-1, i|i]$$

In expressions (3.51), (3.52), (3.53), $\hat{x}[i|i], \hat{\omega}[i|i]$ for each i are obtained from iteration (3.11)-(3.14), and $\hat{x}^S[i-1|i], \hat{\omega}^S[i-1|i], \hat{P}^S[i-1|i], \hat{P}^S[i,i-1|i], \hat{P}^S[i-1,i|i]$ can be obtained from one step of the backward recursion in smoothing based on measurements $Y_0^i = y_0^i$. For example, $$\begin{pmatrix} \hat{x}^S[i-1|i] \\ \hat{\omega}^S[i-1|i] \end{pmatrix} = \begin{pmatrix} \hat{x}[i-1|i-1] \\ \hat{\omega}[i-1|i-1] \end{pmatrix} + \quad (3.54)$$

$$J[i-1]\left\{ \begin{pmatrix} \hat{x}[i|i] \\ \hat{\omega}[i|i] \end{pmatrix} - \begin{pmatrix} A(\hat{\omega}[i-1|i-1]) & 0 \\ 0 & 1 \end{pmatrix} \begin{pmatrix} \hat{x}[i-1|i-1] \\ \hat{\omega}[i-1|i-1] \end{pmatrix} \right\}$$

where $$J[i-1] = \hat{P}[i-1|i-1] \begin{pmatrix} A(\hat{\omega}[i-1|i-1]) & 0 \\ 0 & 1 \end{pmatrix}^T \hat{P}[i|i-1]^{-1} \quad (3.55)$$

$$\hat{P}^S[i-1|i] = \hat{P}[i-1|i-1] + J[i-1](\hat{P}[i|i] - \hat{P}[i|i-1])J[i-1]^T \quad (3.56)$$

$$\hat{P}^S[i, i-1|i] = \hat{P}[i|i]J[i-1]^T \quad (3.57)$$

With available measurements $Y_0^N = y_0^N$, another method of updating the estimate of Q from $\hat{Q}_I$ is to take a weighted average over a selected subset of the following set:

$$\bigcup_{m=1}^{K} \{E(\chi[i]\chi[i]^T | \hat{Q}_I, Y_0^{i+m} = y_0^{i+m}) | i=1,2,\ldots,N-m\} \quad (3.58)$$

for some K. This method may require more than one step of backward recursions in the smoothing, but the amount of computation can be limited by limiting the number K.

III.E Estimating Q and R

This document presented methods of iteratively estimating and improving the covariance, R, of measurement noise (including the randomness due to modeling limitation) for a given covariance of the process noise (including the randomness due to modeling limitation) and methods of iteratively estimating and improving the covariance, Q, of the process noise (including the randomness due to modeling limitation) for a given covariance of the measurement noise (including the randomness due to modeling limitation). The iteration for R and the iteration for Q can alternate to improve both estimates online while the algorithm for estimating the system state is running.

For example, the method of estimating R without knowledge of Q in section III can be used to obtain the initial estimate, $\hat{R}^{(0)}$ of R. Then, the estimate, $\hat{Q}^{(1)}$ estimation of Q can be performed by using methods presented in sections III.B, III.C, III.D after obtaining measurements of Y[0], Y[1]. As new measurement data are obtained, state estimation (3.11)-(3.14) can be run. Also, the estimation of Q can be improved by using methods presented in sections III.B, III.C, III.D with the current estimated value of R, and the estimation of R can be improved by using methods presented in section III.A with the current estimated value of Q.

IV. Online State Estimation and Jointly Estimating Covariance of Process and Measurement Noise Process noise covariance matrix Q and observation noise covariance matrix R can be jointly estimated online as measurements $Y[0]=y[0], Y[1]=y[1], \ldots, Y[N-1], Y[N]$ are being obtained.

At any discrete-time N, from measurements accumulated up to time N, the maximum likelihood estimation of Q can be considered. Suppose we applied a known control sequence $u[0], \ldots, u[N-1]$, which we denote as $u_0^{N-1}$. We can consider a joint Maximum Likelihood (ML) estimation of Q and R based on observations $$Y[0]=y[0], \ldots, Y[N-1]=y[N-1], Y[N]=y[N],$$

which we denote as $Y_0^N = y_0^N$. For a known sequence of inputs control, ML estimation of Q and R is:

$$\arg\max p_{Q,R}(y_0^N) \quad (4.22)$$

where $p_{Q,R}(y_0^N)$ in (4.22) denotes the joint probability density function of $Y[0], \ldots, Y[N-1], y[N-1]$ parametrized by process noise covariance Q and observation noise covariance R. In order to avoid computational difficulties [4] of this ML estimation, we consider applying the idea of Expectation Maximization (EM) [4] algorithm. Suppose the data, which are denoted as $X_0^N$, and $\omega_0^N$, of realized system states $x[i], \omega[i], i=0,1,2,\ldots,N$ were available, as well as the data, $y_0^N$, of the realized measurements $Y[0]=y[0], \ldots, Y[N-1]=y[N-1], Y[N]=y[N]$. Then, the maximum likelihood estimation of Q from data $y_0^N, x_0^N, \omega_0^N$ would be $$\arg\max_{Q,R} p_{Q,R}(y_0^N, x_0^N, \omega_0^N) \quad (4.23)$$

The joint probability density function, $p_{Q,R}(y_0^N, x_0^N, \omega_0^N)$, of measurements Y[0], Y[1], ..., Y[N−1],y[N] and system states $$\binom{x[k]}{\omega[k]},$$

k=0,1,2, ... ,N has the following structure:

$$P_{Q,R}(y_0^N, x_0^N, \omega_0^N) = p(y[0], x[0], \omega[0]) \quad (4.24)$$

$$\prod_{i=1}^{N} p_R(y[i] \mid x[i], \omega[i]) p_Q(x[i], \omega[i] \mid x[i-1], \omega[i-1]),$$

where p(y[0],x[0],ω[0]) in (4.24) denotes the joint probability density function of Y[0] and system state $$\binom{x[0]}{\omega[0]};$$

$p_R(y[i] \mid x[i],\omega[i])$ denotes the joint probability density function of measurement Y[i] conditioned on the state $$\binom{x[i]}{\omega[i]};$$

$p_Q(x[i], \omega[i] \mid x[i-1],\omega[i-1])$ denotes the joint probability density function of the system state at time i, $$\binom{x[i]}{\omega[i]},$$

conditioned on the system state at time i−1, $$\binom{x[i-1]}{\omega[i-1]}.$$

It should be noted that probability density functions p(y[0],x[0],ω[0]) for each i do not depend on parameter Q or R. Thus, from (4.24) we have $$\operatorname{argmax}_{Q,R} p_{Q,R}(y_0^N, x_0^N, \omega_0^N) = \quad (4.25)$$

$$\operatorname{argmax}_{Q,R} \prod_{i=1}^{N} p_Q(x[i], \omega[i] \mid x[i-1], \omega[i-1]) p_R(y[i] \mid x[i], \omega[i])$$

where $\arg\max_{Q,R} p_{Q,R}(y_0^N, x_0^N, \omega_0^N)$ denotes the value of matrix pair (Q,R) that maximizes) function value $p_{Q,R}(y_0^N, x_0^N, \omega_0^N)$, which is evaluated at measurement and state realization $y_0^N, x_0^N, \omega_0^N$. Due to the monotonically increasing property of the natural log, we have $$\operatorname{argmax}_{Q,R} \prod_{i=1}^{N} p_Q(x[i], \omega[i] \mid x[i-1], \omega[i-1]) p_R(y[i] \mid x[i], \omega[i]) = \quad (4.26)$$

$$\operatorname{argmax}_{Q,R} \left[ \begin{array}{c} \sum_{i=1}^{N} \ln p_Q(x[i], \omega[i] \mid x[i-1], \omega[i-1]) + \\ \sum_{i=1}^{N} \ln p_R(y[i] \mid x[i], \omega[i]) \end{array} \right]$$

Under the assumption of Gaussian noise process, from equations (7), (8), (4.25), (4.26), we have $$\operatorname{argmax}_{Q,R} p_{Q,R}(y_0^N, x_0^N, \omega_0^N) = \quad (4.27)$$

$$\operatorname{argmax}_{Q,R} \left[ \begin{array}{c} -\frac{1}{2} \sum_{i=1}^{N} \ln \det Q \\ -\frac{1}{2} \sum_{i=1}^{N} \left\{ \binom{x[i]}{\omega[i]} - \binom{A(\omega[i-1]) \ 0}{0 \ 1} \binom{x[i-1]}{\omega[i-1]} - Bu[i-1] \right\}^T \cdot Q^{-1} \cdot \\ \left\{ \binom{x[i]}{\omega[i]} - \binom{A(\omega[i-1]) \ 0}{0 \ 1} \binom{x[i-1]}{\omega[i-1]} - Bu[i-1] \right\} \\ -\frac{1}{2} \sum_{i=1}^{N} \ln \det R \\ -\frac{1}{2} \sum_{i=1}^{N} \left\{ y[i] - C\binom{x[i]}{\omega[i]} \right\}^T R^{-1} \left\{ y[i] - C\binom{x[i]}{\omega[i]} \right\} \end{array} \right]$$

where det Q denotes the determinant of matrix Q and detR denotes the determinant of matrix R. Seeking the maximizing (Q, R) in (4.27) is equivalent to seeking the minimizing (Q, R) for a function of opposite polarity, which is denoted as $$\operatorname{argmin}_{Q,R} \begin{bmatrix} N\ln\det Q + \\ \sum_{i=1}^{N} \left\{ \begin{pmatrix} x[i] \\ \omega[i] \end{pmatrix} - \begin{pmatrix} A(\omega[i-1]) & 0 \\ 0 & 1 \end{pmatrix} \begin{pmatrix} x[i-1] \\ \omega[i-1] \end{pmatrix} - \\ Bu[i-1] \end{pmatrix} \right\}^T \cdot Q^{-1} \cdot \\ \left\{ \begin{pmatrix} x[i] \\ \omega[i] \end{pmatrix} - \begin{pmatrix} A(\omega[i-1]) & 0 \\ 0 & 1 \end{pmatrix} \begin{pmatrix} x[i-1] \\ \omega[i-1] \end{pmatrix} - \\ Bu[i-1] \end{pmatrix} \right\} + N\ln\det R + \\ \sum_{i=1}^{N} \left\{ y[i] - C\begin{pmatrix} x[i] \\ \omega[i] \end{pmatrix} \right\}^T R^{-1} \left\{ y[i] - C\begin{pmatrix} x[i] \\ \omega[i] \end{pmatrix} \right\} \end{bmatrix} \quad (4.28)$$

For simplicity of description, we denote $$\chi[i] = \begin{pmatrix} x[i] \\ \omega[i] \end{pmatrix} - \begin{pmatrix} A(\omega[i-1]) & 0 \\ 0 & 1 \end{pmatrix} \begin{pmatrix} x[i-1] \\ \omega[i-1] \end{pmatrix} - Bu[i-1] \quad (4.29)$$

$$= \begin{pmatrix} x[i] \\ \omega[i] \end{pmatrix} - \begin{pmatrix} A(\omega[i-1])x[i-1] \\ \omega[i-1] \end{pmatrix} - Bu[i-1]$$

Then, minimizer (4.28) can be expressed as $$\operatorname{argmin}_{Q,R} \begin{bmatrix} N\ln\det Q + \sum_{i=1}^{N} \chi[i]^T Q^{-1} \chi[i] + N\ln\det R + \\ \sum_{i=1}^{N} \left\{ y[i] - C\begin{pmatrix} x[i] \\ \omega[i] \end{pmatrix} \right\}^T R^{-1} \left\{ y[i] - C\begin{pmatrix} x[i] \\ \omega[i] \end{pmatrix} \right\} \end{bmatrix} = \quad (4.30)$$

$$\operatorname{argmin}_{Q,R} \begin{bmatrix} N\ln\det Q + tr\left( Q^{-1} \sum_{i=1}^{N} \chi[i]\chi[i]^T \right) + N\ln\det R + \\ tr\left( R^{-1} \sum_{i=1}^{N} \left\{ y[i] - C\begin{pmatrix} x[i] \\ \omega[i] \end{pmatrix} \right\} \left\{ y[i] - C\begin{pmatrix} x[i] \\ \omega[i] \end{pmatrix} \right\}^T \right) \end{bmatrix}$$

where tr(M) for a matrix M denoted the trace (sum of diagonal elements) of the matrix M. If data $y_0^N, x_0^N, \omega_0^N$ were available, the minimizer in (4.30) would be $$Q = \operatorname{argmin}_Q \left\{ N\ln\det Q + tr\left( Q^{-1} \sum_{i=1}^{N} \chi[i]\chi[i]^T \right) \right\} \quad (4.31)$$

$$= \left(\frac{1}{N}\right) \sum_{i=1}^{N} \chi[i]\chi[i]^T$$

$$R = R = \left(\frac{1}{N}\right) \sum_{i=1}^{N} \left\{ y[i] - C\begin{pmatrix} x[i] \\ \omega[i] \end{pmatrix} \right\} \left\{ y[i] - C\begin{pmatrix} x[i] \\ \omega[i] \end{pmatrix} \right\}^T$$

Therefore, (4.31) would be the maximum likelihood estimation of Q from data $y_0^N, x_0^N, \omega_0^N$. However, the realized values of system states $X[i], \omega[i], i=0,1,2,\ldots,N$ are not available. Only the measurement data $Y[0]=y[0], \ldots, Y[N-1]=y[N-1], Y[N]=y[N]$ are available at discrete time N. Thus, the realized data of random signal $\chi[i]$, $$y[i] - C\begin{pmatrix} x[i] \\ \omega[i] \end{pmatrix},$$

$i=0,1,2,\ldots$ are not available. Although the realized data of these random signals are not available, from (4.30) and (4.31) iterative methods of estimating Q and R can be derived. For example, one iterative method is to obtain a new estimate, $\hat{Q}_{l+1}$, of Q and estimate $\hat{R}_{l+1}$, of R from a current estimates, $\hat{Q}_l$ of Q and $\hat{R}_l$, of R and by the following:

$$\hat{Q}_{l+1} = \left(\frac{1}{N}\right) \sum_{i=1}^{N} E(\chi[i]\chi[i]^T \mid \hat{Q}_l, \hat{R}_l, Y_0^N = y_0^N) \quad (4.32a)$$

$$\hat{R}_{l+1} = \left(\frac{1}{N}\right) \sum_{i=1}^{N} E \quad (4.32b)$$

$$\left[ \left\{ y[i] - C\begin{pmatrix} x[i] \\ \omega[i] \end{pmatrix} \right\} \left\{ y[i] - C\begin{pmatrix} x[i] \\ \omega[i] \end{pmatrix} \right\}^T \mid \hat{Q}_l, \hat{R}_l, Y_0^N = y_0^N \right]$$

where the second-order statistics of $\chi[i], i=0,1,2,\ldots,N$ and $$y[i] - C\begin{pmatrix} x[i] \\ \omega[i] \end{pmatrix},$$

$i=0,1,2,\ldots,N$ in (4.32) are conditional on the realization of random variables $Y[0]=y[0], \ldots, Y[N-1]=y[N-1], Y[N]=y[N]$ and under the assumption that the covariance of the process noise is $\hat{Q}_l$ and the observation noise is $\hat{R}_l$. Expressions (4.32a) (4.32b) are equivalent to $$(\hat{Q}_{l+1}, \hat{R}_{l+1}) = \operatorname{argmin}_{Q,R} \begin{bmatrix} N\ln\det Q + tr\left\{ Q^{-1} \sum_{i=1}^{N} E(\chi[i]\chi[i]^T \mid \hat{Q}_l, \hat{R}_l, Y_0^N = y_0^N) \right\} + \\ N\ln\det R + \\ tr\left( R^{-1} \sum_{i=1}^{N} E\left[ \left\{ y[i] - C\begin{pmatrix} x[i] \\ \omega[i] \end{pmatrix} \right\} \left\{ y[i] - C\begin{pmatrix} x[i] \\ \omega[i] \end{pmatrix} \right\}^T \mid \hat{Q}_l, \hat{R}_l, Y_0^N = y_0^N \right] \right) \end{bmatrix} \quad (4.33)$$

From the definition of argmin in (4.33), we have $$N\ln\det\hat{Q}_{l+1} + \tag{4.34}$$

$$tr\left\{\hat{Q}_{l+1}^{-1}\sum_{i=1}^{N}E(\chi[i]\chi[i]^T \mid \hat{Q}_l, \hat{R}_l, Y_0^N = y_0^N)\right\} + N\ln\det\hat{R}_{l+1} +$$

$$tr\left\{\hat{R}_{l+1}^{-1}\sum_{i=1}^{N}E\left[\left\{y[i]-C\binom{x[i]}{\omega[i]}\right\}\left\{y[i]-C\binom{x[i]}{\omega[i]}\right\}^T \mid \hat{Q}_l,\right.\right.$$

$$\left.\left. \hat{R}_l, Y_0^N = y_0^N \right]\right\} \leq N\ln\det\hat{Q}_l +$$

$$tr\left\{\hat{Q}_l^{-1}\sum_{i=1}^{N}E(\chi[i]\chi[i]^T \mid \hat{Q}_l, \hat{R}_l, Y_0^N = y_0^N)\right\} + N\ln\det\hat{R}_l^{-1} +$$

$$tr\left\{\hat{R}_l^{-1}\sum_{i=1}^{N}E\left[\left\{y[i]-C\binom{x[i]}{\omega[i]}\right\}\left\{y[i]-C\binom{x[i]}{\omega[i]}\right\}^T \mid \hat{Q}_l,\right.\right.$$

$$\left.\left.\hat{R}_l, Y_0^N = y_0^N\right]\right\}$$

It can be mathematically proven that in iteration (4.32) or (4.33)

$$p_{\hat{Q}_{l+1},\hat{R}_{l+1}}(y_0^N) \leq p_{\hat{Q}_l,\hat{R}_l} \tag{4.35}$$

Inequality (4.35) shows each step in iteration (4.34) produces a new estimate that is no worse than the previous estimate toward the goal of the maximum likelihood estimation $\arg\max p_{Q,R}(y_0^N)$. It can be also proven that strict inequality in (4.35) (improvement of estimation) is achieved if strict inequality in (4.34) is achieved.

Iteration (4.32a) and (4.32b) can run multiple times to improve the estimates of Q and R for the same set of measurements, $y_0^N$. Also, we can use the updated value of covariance, $\hat{Q}_{l+1}$, obtained form (4.32a) in place of $\hat{Q}_l$ in (4.32b). Namely, we can use $$\hat{R}_{l+1} =$$

$$\left(\frac{1}{N}\right)\sum_{i=1}^{N}E\left[\left\{y[i]-C\binom{x[i]}{\omega[i]}\right\}\left\{y[i]-C\binom{x[i]}{\omega[i]}\right\}^T \mid \hat{Q}_{l+1}, \hat{R}_l, Y_0^N = y_0^N\right]$$

instead of (4.32b) for updating the estimate of covariance R after performing (4.32a). Or, we can perform (4.32b) first to obtain $$\hat{R}_{l+1} =$$

$$\left(\frac{1}{N}\right)\sum_{i=1}^{N}E\left[\left\{y[i]-C\binom{x[i]}{\omega[i]}\right\}\left\{y[i]-C\binom{x[i]}{\omega[i]}\right\}^T \mid \hat{Q}_{l+1}, \hat{R}_l, Y_0^N = y_0^N\right]$$

and use the updated value $\hat{R}_{l+1}$ in place of $\hat{R}_l$ in (4.32a)—that is, to perform $$\hat{Q}_{l+1} = \left(\frac{1}{N}\right)\sum_{i=1}^{N}E(\chi[i]\chi[i]^T \mid \hat{Q}_l, \hat{R}_{l+1}, Y_0^N = y_0^N)$$

Or, one can skip the updating of Q or R in (4.32a), (4.32b) in some iteration 1.

Iteration (4.32a) (4.32b) can be designed to intertwine the steps of improving the estimate of Q for the same measurements $y_0^N$ with the steps of responding to a new measurement. For example, after running iteration (4.32a) and/or (4.32b) k times or after running iteration (4.33) times for some number k, the next update of Q and/or R can be made in response to new measurements Y[N+1]=y[N+1] toward the following goal:

$$\hat{Q}_{l+k+1} = \arg\min_Q\left[(N+1)\ln\det Q + \right. \tag{4.36a}$$

$$\left. tr\left\{Q^{-1}\sum_{i=1}^{N+1}E(\chi[i]\chi[i]^T \mid \hat{Q}_{l+k}, \hat{R}_{l+k}, Y_0^{N+1} = y_0^{N+1})\right\}\right] =$$

$$\frac{1}{N+1}\sum_{i=1}^{N+1}E(\chi[i]\chi[i]^T \mid \hat{Q}_{l+k}, Y_0^{N+1} = y_0^{N+1})$$

$$\hat{R}_{l+k+1} = \arg\min_Q\left[(N+1)\ln\det Q + \right. \tag{4.36b}$$

$$\left. tr\left\{Q^{-1}\sum_{i=1}^{N+1}E(\chi[i]\chi[i]^T \mid \hat{Q}_{l+k}, \hat{R}_{l+k}, Y_0^{N+1} = y_0^{N+1})\right\}\right] =$$

$$\frac{1}{N+1}\sum_{i=1}^{N+1}E\left[\left\{y[i]-C\binom{x[i]}{\omega[i]}\right\}\left\{y[i]-C\binom{x[i]}{\omega[i]}\right\}^T \mid \hat{Q}_{l+k},\right.$$

$$\left.\hat{R}_{l+k}, Y_0^N = y_0^N\right]$$

Iteration (4.32a), (4.32b), (4.33) require computation of $$E(\chi[i]\chi[i]^T \mid \hat{Q}_l, \hat{R}_l, Y_0^N = y_0^N)$$

and $$E\left[\left\{y[i]-C\binom{x[i]}{\omega[i]}\right\}\left\{y[i]-C\binom{x[i]}{\omega[i]}\right\}^T \mid \hat{Q}_l, \hat{R}_l, Y_0^N = y_0^N\right]$$

for i=1,2, . . . ,N. As the discrete-time N increases, the amount of computation can become too large. A method of updating the estimate of Q and R with reduced amount of computation is to average over a selected subset of the following set, $$\{E(\chi[i]\chi[i]^T \mid \hat{Q}_l, \hat{R}_l, Y_0^N = y_0^N) \mid i=1,2,\ldots,N\}, \tag{4.37}$$

in place of (4.32a) and to average over a selected subset of the following set, $$\left\{E\left[\left\{y[i]-C\binom{x[i]}{\omega[i]}\right\}\left\{y[i]-C\binom{x[i]}{\omega[i]}\right\}^T \mid \hat{Q}_l, \hat{R}_l, Y_0^N = y_0^N\right] \mid i=1,\right.$$

$$\left. 2,\ldots,N\right\}$$

in place of (4.32b). For example, in place of (4.32a) one can use $$\hat{Q}_{l+1} = \left(\frac{1}{K}\right) \sum_{i=N-K+1}^{N} E(\chi[i]\chi[i]^T | \hat{Q}_l, \hat{R}_l, Y_0^N = y_0^N) \quad (4.38)$$

for some value K. Method (4.38) contributes to tracking time-varying Q, if Q is time-varying, as well as reducing the amount of computation. For another example, a weighted average over a subset of $\{E(\chi[i]\chi[i]^T|\hat{Q}_l,\hat{R}_l,Y_0^N=y_0^N)|i=1, 2, \ldots, N\}$ can be used as the estimate of Q. For another example, in place of (4.32b) one can use $$\hat{R}_{l+1} = \left(\frac{1}{K}\right) \sum_{i=N-K+1}^{N} E\left(\left\{y[i] - C\binom{x[i]}{\omega[i]}\right\}\left\{y[i] - C\binom{x[i]}{\omega[i]}\right\}^T \bigg| \hat{Q}_l, \hat{R}_l, Y_0^N = y_0^N\right)$$

IV.A Methods of Evaluating $E(\chi[i]\chi[i]^T|\hat{Q}_l,\hat{R}_l,Y_0^N=y_0^N)$
This section presents methods of evaluating $$E(\chi[i]\chi[i]^T|\hat{Q}_l,\hat{R}_l,Y_0^N=y_0^N),$$

which can be used for iteration (4.32a), (4.32b), (4.33), (4.36a), (4.36b), and (4.38). For i<N, computing $E(\chi[i]\chi[i]^T|\hat{Q}_l,\hat{R}_l,Y_0^N=y_0^N)$ can be considered as a smoothing [5] operation. Thus, for i<N, $E(\chi[i]\chi[i]^T|\hat{Q}_l,\hat{R}_l,Y_0^N=y_0^N)$ can be computed by running a smoothing algorithm under the assumption that the process noise covariance matrix Q is $\hat{Q}_l$ and the observation noise covariance is $\hat{R}_l$. For example, the extended Kalman smoothing [6] idea can be applied for that purpose. First, it is noted that $$E[\chi[i]\chi[i]^T|\hat{Q}_l,\hat{R}_l,Y_0^N=y_0^N] = E[\{\chi[i]-E(\chi[i]|\hat{Q}_l,Y_0^N=y_0^N)\}\{\chi[i]-E(\chi[i]|\hat{Q}_l,Y_0^N=y_0^N)\}^T|\hat{Q}_l,\hat{R}_l,Y_0^N=y_0^N] + E(\chi[i]|\hat{Q}_l,\hat{R}_l,Y_0^N=y_0^N)E(\chi[i]|\hat{Q}_l,\hat{R}_l,Y_0^N=y_0^N)^T \quad (4.39)$$

For reducing computation, the following approximation can be used:

$$\chi[i] \approx \binom{x[i]}{\omega[i]} - \binom{A(\hat{\omega}^S[i-1|N]) \quad 0}{0 \quad 1}\binom{x[i-1]}{\omega[i-1]} - Bu[i-1], \quad (4.40)$$

where $\hat{\omega}^S[i-1|N]$ is an a posteriori estimation of state variable $\omega[i-1]$ after knowing the realized measurement values $Y_0^N=y_0^N$. Another method is to use the following approximation:

$$\chi[i] \approx \binom{x[i]}{\omega[i]} - \binom{A(\hat{\omega}[i-1|i-1]) \quad 0}{0 \quad 1}\binom{x[i-1]}{\omega[i-1]} - Bu[i-1], \quad (4.41)$$

where $\hat{\omega}[i-1|i-1]$ is an a posteriori estimation of state variable $\omega[i-1]$ after knowing the realized measurement values $Y_0^{i-1}=y_0^{i-1}$ and can be obtained from iterations (10)-(13). With such an approximation, the approximate value of $E(\chi[i]\chi[i]^T|\hat{Q}_l,\hat{R}_l,Y_0^N=y_0^N)$ in (4.39) can be approximately evaluated from the output of the extended Kalman smoothing [6]. For example, $E(\chi[i]|\hat{Q}_l,\hat{R}_l,Y_0^N=y_0^N)$ in (4.39) can be approximately evaluated from the output of the extended Kalman smoothing, $$\binom{\hat{x}^S[i|N]}{\hat{\omega}^S[i|N]} - \binom{A(\hat{\omega}^S[i-1|N]) \quad 0}{0 \quad 1}\binom{\hat{x}^S[i-1|N]}{\hat{\omega}^S[i-1|N]} - Bu[i-1], \quad (4.42)$$

where $$\binom{\hat{x}^S[i|N]}{\hat{\omega}^S[i|N]} \text{ and } \binom{\hat{x}^S[i-1|N]}{\hat{\omega}^S[i-1|N]}$$

denote part of the extended Kalman smoothing output that provides an a posteriori estimate of system states $$\binom{x[i]}{\omega[i]} \text{ and } \binom{x[i-1]}{\omega[i-1]},$$

respectively, after having the realized measurement values $Y_0^N=y_0^N$. Another method is to approximate $E(\chi[i]|\hat{Q}_l,\hat{R}_l,Y_0^N=y_0^N)$ in (3.39) by $$\binom{\hat{x}^S[i|N]}{\hat{\omega}^S[i|N]} - \binom{A(\hat{\omega}[i-1|i-1]) \quad 0}{0 \quad 1}\binom{\hat{x}^S[i-1|N]}{\hat{\omega}^S[i-1|N]} - Bu[i-1] \quad (4.43)$$

Also, $E[\{\chi[i]-E(\chi[i]|\hat{Q}_l,Y_0^N=y_0^N)\}\{\chi[i]-E(\chi[i]|\hat{Q}_l,Y_0^N=y_0^N)\}^T|\hat{Q}_l,\hat{R}_l,Y_0^N=y_0^N]$ in (4.39) can be approximately evaluated, under the specified value of $\hat{Q}_l$ and measurement noise covariance $\hat{R}_l$, from the output of the extended Kalman smoothing [6], $\hat{P}^S[i|N]$, $\hat{P}^S[i-1|N]$, which denote the extended Kalman smoothing's approximation to the covariance matrix of $$\binom{x[i]}{\omega[i]} \text{ and } \binom{x[i-1]}{\omega[i-1]},$$

respectively, conditional on $Y_0^N=y_0^N$, and $\hat{P}^S[i,i-1|N]$, which denotes the extended Kalman smoothing's approximation to the cross-covariance between $$\binom{x[i]}{\omega[i]} \text{ and } \binom{x[i-1]}{\omega[i-1]}$$

conditional on $Y_0^N=y_0^N$. For example, $E[\{\chi[i]-E(\chi[i]|\hat{Q}_l,Y_0^N=y_0^N)\}\{\chi[i]-E(\chi[i]|\hat{Q}_l,Y_0^N=y_0^N)\}^T|\hat{Q}_l,\hat{R}_l,Y_0^N=y_0^N]$ can be approximated by $$\hat{P}^S[i|N] + \binom{A(\hat{\omega}[i-1|i-1]) \quad 0}{0 \quad 1}\hat{P}^S[i-1|N]\binom{A(\hat{\omega}[i-1|i-1]) \quad 0}{0 \quad 1}^T - \hat{P}^S[i,i-1|N]\binom{A(\hat{\omega}[i-1|i-1]) \quad 0}{0 \quad 1}^T - \binom{A(\hat{\omega}[i-1|i-1]) \quad 0}{0 \quad 1}\hat{P}^S[i-1,i|N] \quad (4.44)$$

IV.B Methods of Evaluating $$E\left[\left\{y[i] - C\binom{x[i]}{\omega[i]}\right\}\left\{y[i] - C\binom{x[i]}{\omega[i]}\right\}^T \middle| \hat{Q}_t, \hat{R}_t, Y_0^N = y_0^N\right]$$

We note that given the data $Y_0^N = y_0^N$, the value of variables $y[i]$ are in the sequence $y_0^N$. We have $$E\left[\left\{y[i] - C\binom{x[i]}{\omega[i]}\right\}\left\{y[i] - C\binom{x[i]}{\omega[i]}\right\}^T \middle| \hat{Q}_t, \hat{R}_t, Y_0^N = y_0^N\right] =$$

$$y[i]y[i]^T - y[i]\binom{\hat{x}^S[i|N]}{\hat{\omega}^S[i|N]}^T C^T - C\binom{\hat{x}^S[i|N]}{\hat{\omega}^S[i|N]}y[i]^T +$$

$$CE\left[\binom{x[i]}{\omega[i]}\binom{x[i]}{\omega[i]}^T \middle| \hat{Q}_t, \hat{R}_t, Y_0^N = y_0^N\right]C^T =$$

$$y[i]y[i]^T - y[i]\binom{\hat{x}^S[i|N]}{\hat{\omega}^S[i|N]}^T C^T - C\binom{\hat{x}^S[i|N]}{\hat{\omega}^S[i|N]}y[i]^T +$$

$$C\hat{P}^S[i|N]C^T + C\binom{\hat{x}^S[i|N]}{\hat{\omega}^S[i|N]}\binom{\hat{x}^S[i|N]}{\hat{\omega}^S[i|N]}^T C^T$$

where $$\binom{\hat{x}^S[i|N]}{\hat{\omega}^S[i|N]}$$

denotes part of the extended Kalman smoothing output that provides an a posteriori estimate of system states $$\binom{x[i]}{\omega[i]}$$

after having the realized measurement values $Y_0^N = y_0^N$ and $\hat{P}^S[i|N]$ denotes the extended Kalman smoothing's approximation to the covariance matrix of $$\binom{x[i]}{\omega[i]},$$

conditional on $Y_0^N = y_0^N$.

IV.C Jointly Estimating/Updating Q and R without Smoothing

This section presents methods of updating the estimates of Q without running the extended Kalman smoothing operation. A simple method of updating Q, after obtaining measurements $Y_0^N = y_0^N$ is to average over a selected subset of the following set:

$$\left\{\left|\left\{\binom{\hat{x}[i|i]}{\hat{\omega}[i|i]} - \binom{A(\hat{\omega}[i-1|i-1])\ 0}{0\ 1}\binom{\hat{x}[i-1|i-1]}{\hat{\omega}[i-1|i-1]} - Bu[i-1]\right\}\right.\right.$$
$$\left.\left.\left\{\binom{\hat{x}[i|i]}{\hat{\omega}[i|i]} - \binom{A(\hat{\omega}[i-1|i-1])\ 0}{0\ 1}\binom{\hat{x}[i-1|i-1]}{\hat{\omega}[i-1|i-1]} - Bu[i-1]\right\}^T\right|_{i=1,2,\ldots,N}\right\} \quad (4.45a)$$

where in this set (4.45a) the estimates $\hat{x}[i|i], \hat{\omega}[i|i]$, $\hat{x}[i-1|i-1], \hat{\omega}[i-1|i-1]$ are based on the current values of Q and R, say $\hat{Q}_t, \hat{R}_t$. For example, one can use $$\left(\frac{1}{K}\right)\sum_{i=N-K+1}^{N}\left\{\binom{\hat{x}[i|i]}{\hat{\omega}[i|i]} - \binom{A(\hat{\omega}[i-1|i-1])\ 0}{0\ 1}\binom{\hat{x}[i-1|i-1]}{\hat{\omega}[i-1|i-1]} - Bu[i-1]\right\}$$
$$\left\{\binom{\hat{x}[i|i]}{\hat{\omega}[i|i]} - \binom{A(\hat{\omega}[i-1|i-1])\ 0}{0\ 1}\binom{\hat{x}[i-1|i-1]}{\hat{\omega}[i-1|i-1]} - Bu[i-1]\right\}^T \quad (4.46a)$$

for some value K. For another example, a weighted average over a subset of (4.45a) can be used as the estimate of Q. An example of such a weighted average is $$\frac{1}{\sum_{\tau=0}^{L}\rho^\tau}\sum_{i=0}^{L}\rho^i\left\{\binom{\hat{x}[N-i-1|N-i-1]}{\hat{\omega}[N-i-1|N-i-1]} - \binom{A(\hat{\omega}[N-i-1|N-i-1])\ 0}{0\ 1}\binom{\hat{x}[N-i-1|N-i-1]}{\hat{\omega}[N-i-1|N-i-1]} - Bu[N-i-1]\right\}$$
$$\left\{\binom{\hat{x}[N-i|N-i]}{\hat{\omega}[N-i|N-i]} - \binom{A(\hat{\omega}[N-i-1|N-i-1])\ 0}{0\ 1}\binom{\hat{x}[N-i-1|N-i-1]}{\hat{\omega}[N-i-1|N-i-1]} - Bu[N-i-1]\right\}^T \quad (4.47a)$$

for some positive integer L and $0 < \rho < 1$. In these methods, the backward recursion of the extended Kalman filter is not required. The estimates $\hat{x}[i|i], \hat{\omega}[i|i]$ for each i are available from iteration (10)-(13), which is performed under the current estimate of Q and R at each time t.

Estimating and updating R can be also performed without running the extended Kalman smoothing operation. A simple method of updating Q, after obtaining measurements $Y_0^N = y_0^N$ is to average over a selected subset of the following set:

$$\left\{ \left[ y[i] - C\begin{pmatrix} \hat{x}[i|i] \\ \hat{\omega}[i|i] \end{pmatrix} \right]\left[ y[i] - C\begin{pmatrix} \hat{x}[i|i] \\ \hat{\omega}[i|i] \end{pmatrix} \right]^T \Big| i = 1, 2, \ldots, N \right\}, \quad (4.45b)$$

where estimates $\hat{x}[i|i], \hat{\omega}[i|i]$ for each i are under the current estimate of Q and R, $\hat{Q}_I, \hat{R}_I$. For example, one can use $$\hat{R}_{I+1} = \left(\frac{1}{K}\right) \sum_{i=N-K+1}^{N} \left[ y[i] - C\begin{pmatrix} \hat{x}[i|i] \\ \hat{\omega}[i|i] \end{pmatrix} \right]\left[ y[i] - C\begin{pmatrix} \hat{x}[i|i] \\ \hat{\omega}[i|i] \end{pmatrix} \right]^T \quad (4.46b)$$

for some value K. For another example, a weighted average over a subset of (4.45b) can be used as the estimate of R. An example of such a weighted average is $$\hat{R}_{I+1} = \frac{1}{\sum_{\tau=0}^{L} \rho^\tau} \cdot \sum_{i=0}^{L} \rho^i \left[ y[N-i] - C\begin{pmatrix} \hat{x}[N-i|N-i] \\ \hat{\omega}[N-i|N-i] \end{pmatrix} \right] \quad (4.47b)$$

$$\left[ y[i] - C\begin{pmatrix} \hat{x}[N-i|N-i] \\ \hat{\omega}[N-i|N-i] \end{pmatrix} \right]^T$$

for some positive integer L and $0<\rho<1$.

IV.D Jointly Estimating Q and R with a Small Number of Backward Recursion in Smoothing With available measurements $Y_0^N = y_0^N$, another method of updating the estimate of Q from $\hat{Q}_I, \hat{R}_I$ is to average over a selected subset of the following set $$\{E(\chi[i]\chi[i]^T|\hat{Q}_I,\hat{R}_I,Y_0^i=y_0^i)|i=1,2,\ldots,N\}. \quad (4.48)$$

For example, one can estimate Q as the following:

$$\hat{Q}_{I+1} = \left(\frac{1}{K}\right) \sum_{i=N-K+1}^{N} E(\chi[i]\chi[i]^T|\hat{Q}_I, \hat{R}_I, Y_0^i = y_0^i) \quad (4.49)$$

for some value K. Method (4.49) differs from (4.38) in that no more than one backward smoothing of the system state is required.

$$E[\chi[i]\chi[i]^T|\hat{Q}_I,\hat{R}_I,Y_0^i=y_0^i] = E[\{\chi[i]-E(\chi[i]|\hat{Q}_I,\hat{R}_I,Y_0^i=y_0^i)\}\{\chi[i]-E(\chi[i]|\hat{Q}_I,\hat{R}_I,Y_0^i=y_0^i)\}^T|\hat{Q}_I,\hat{R}_I,Y_0^i=y_0^i] + E(\chi[i]|\hat{Q}_I,\hat{R}_I,Y_0^i=y_0^i)E(\chi[i]|\hat{Q}_I,\hat{R}_I,Y_0^i=y_0^i)^T \quad (4.50)$$

can be approximated from the results of ongoing iteration for state estimation (10)-(13), which is performed under the current estimate of Q and R, $\hat{Q}_I,\hat{R}_I$, at each time t and only one step of backward recursion in Kalman smoothing. For example, the term $E(\chi[i]|\hat{Q}_I,\hat{R}_I,Y_0^i=y_0^i)$ in (4.50) can be approximated by $$\begin{pmatrix} \hat{x}[i|i] \\ \hat{\omega}[i|i] \end{pmatrix} - \begin{pmatrix} A(\hat{\omega}^S[i-1|i]) & 0 \\ 0 & 1 \end{pmatrix}\begin{pmatrix} \hat{x}^S[i-1|i] \\ \hat{\omega}^S[i-1|i] \end{pmatrix} - Bu[i-1], \quad (4.51)$$

where $\hat{x}[i|i], \hat{\omega}[i|i]$ are obtained from iteration (10)-(13), and $\hat{x}^S[i-1|i], \hat{\omega}^S[i-1|i]$ can be obtained from one step of the backward recursion in smoothing based on measurements $Y_0^i = y_0^i$. Also, the term $E[\{\chi[i]-E(\chi[i]|\hat{Q}_I,\hat{R}_I,Y_0^i=y_0^i)\}\{\chi[i]-E(\chi[i]|\hat{Q}_I,\hat{R}_I,Y_0^i=y_0^i)\}^T|\hat{Q}_I,\hat{R}_I,Y_0^i=y_0^i]$ can be approximated by $$\hat{P}[i|i] + \begin{pmatrix} A(\hat{\omega}[i-1|i-1]) & 0 \\ 0 & 1 \end{pmatrix}\hat{P}^S[i-1|i]\begin{pmatrix} A(\hat{\omega}[i-1|i-1]) & 0 \\ 0 & 1 \end{pmatrix}^T - \quad (4.52)$$

$$\hat{P}^S[i,i-1|i]\begin{pmatrix} A(\hat{\omega}[i-1|i-1]) & 0 \\ 0 & 1 \end{pmatrix}^T -$$

$$\begin{pmatrix} A(\hat{\omega}[i-1|i-1]) & 0 \\ 0 & 1 \end{pmatrix}\hat{P}^S[i-1,i|i]$$

Another method is to approximate $E[\{\chi[i]-E(\chi[i]|\hat{Q}_I,\hat{R}_I,Y_0^i=y_0^i)\}\{\chi[i]-E(\chi[i]|\hat{Q}_I,\hat{R}_I,Y_0^i=y_0^i)\}^T|\hat{Q}_I,\hat{R}_I,Y_0^i=y_0^i]$ by $$\hat{P}[i|i] + \begin{pmatrix} A(\hat{\omega}^S[i-1|i]) & 0 \\ 0 & 1 \end{pmatrix}\hat{P}^S[i-1|i]\begin{pmatrix} A(\hat{\omega}^S[i-1|i]) & 0 \\ 0 & 1 \end{pmatrix}^T - \quad (4.53)$$

$$\hat{P}^S[i,i-1|i]\begin{pmatrix} A(\hat{\omega}^S[i-1|i]) & 0 \\ 0 & 1 \end{pmatrix}^T -$$

$$\begin{pmatrix} A(\hat{\omega}^S[i-1|i]) & 0 \\ 0 & 1 \end{pmatrix}\hat{P}^S[i-1,i|i]$$

In expressions (4.51), (4.52), (4.53), $\hat{x}[i|i], \hat{\omega}[i|i]$ for each i are obtained from iteration (10)-(13), and $\hat{x}^S[i-1|i], \hat{\omega}^S[i-1|i], \hat{P}^S[i-1|i], \hat{P}^S[i,i-1|i], \hat{P}^S[i-1,i|i]$ can be obtained from one step of the backward recursion in smoothing based on measurements $Y_0^i = y_0^i$. For example, $$\begin{pmatrix} \hat{x}^S[i-1|i] \\ \hat{\omega}^S[i-1|i] \end{pmatrix} = \begin{pmatrix} \hat{x}[i-1|i-1] \\ \hat{\omega}[i-1|i-1] \end{pmatrix} + \quad (4.54)$$

$$J[i-1]\left\{ \begin{pmatrix} \hat{x}[i|i] \\ \hat{\omega}[i|i] \end{pmatrix} - \begin{pmatrix} A(\hat{\omega}[i-1|i-1]) & 0 \\ 0 & 1 \end{pmatrix}\begin{pmatrix} \hat{x}[i-1|i-1] \\ \hat{\omega}[i-1|i-1] \end{pmatrix} \right\}$$

where $$J[i-1] = \hat{P}[i-1|i-1]\begin{pmatrix} A(\hat{\omega}[i-1|i-1]) & 0 \\ 0 & 1 \end{pmatrix}^T \hat{P}[i|i-1]^{-1} \quad (4.55)$$

$$\hat{P}^S[i-1|i] = \hat{P}[i-1|i-1] + J[i-1](\hat{P}[i|i] - \hat{P}[i|i-1])J[i-1]^T \quad (4.56)$$

$$\hat{P}^S[i,i-1|i] = \hat{P}[i|i]J[i-1]^T \quad (4.57)$$

With available measurements $Y_0^N = y_0^N$, another method of updating the estimate of Q from $\hat{Q}_I,\hat{R}_I$ is to take weighted average over a selected subset of the following set:

$$\cup_{m=1}^{K} \{E(\chi[i]\chi[i]^T|\hat{Q}_I,\hat{R}_I,Y_0^{i+m}=y_0^{i+m})|i=1,2,\ldots,N-m\} \quad (4.58)$$

for some K. This method may require more than one step of backward recursions in the smoothing, but the amount of computation can be limited by limiting the number K.

With available measurements $Y_0^N = y_0^N$, another method of updating the estimate of R from $\hat{Q}_l, \hat{R}_l$ is to take a weighted average over a selected subset of the following set:

$$\bigcup_{m=1}^{K} \left\{ E\left[ \left\{ y[i] - c\left(\frac{x[i]}{\omega[i]}\right) \right\} \left\{ y[i] - c\left(\frac{x[i]}{\omega[i]}\right) \right\} \right] \middle| i = 1, 2, \ldots, N-m \right\} \quad (4.59)$$

for some K. This method may require more than one step of backward recursions in the smoothing, but the amount of computation can be limited by limiting the number K.

LIST OF REFERENCES

[1] R. Marino, P. Tomei, and C. M. Verrelli, *Induction Motor Control Design*, Springer, 2010.
[2] Fred Daum, "Nonlinear filters: beyond the Kalman filter," *IEEE Aerospace and Electronic Systems Magazine*, vol. 20, Issue 8, pp. 57-69, 2005.
[3] Robert Bos, Xavier Bombois, Paul M. J. Van den Hof, "Designing a Kalman filter when no noise covariance information is available," in *Proceedings of the 16th IFAC World Conference*, Prague, Czech Republic, 2005.
[4] Thomas B. Schön, Adrian Wills, Brett Ninness, "System identification of nonlinear state-space models," *Automatica*, vol. 47, pp. 39-49, 2011.
[5] R. H. Shumway and D. S. Stoffer, "An approach to time series smoothing and forecasting using the EM algorithm," *Journal of Time Series Analysis*, vol. 3, Issue 4, pp. 253-264, July, 1982.
[6] Patrik Axelsson, Umut Orguner, Fredrik Gustafsson, and Mikael Norrlöf, "ML estimation of process noise variance in dynamic systems," Linköpings universitet, Linköping, Sweden, Report no. LiTH-ISY-R-2969, Oct. 8, 2010.
[7] K. L. Shi, T. F. Chan, Y. K. Wong, S. L. Ho, "Speed estimation of an induction motor drive using an optimized extended Kalman filter," IEEE Trans. Industrial Electronics, vol. 49, no. 1, pp. 124-133, February, 2002.
[8] Xianshun Chen, Yew-Soon Ong, Meng-Hiot Lim, and Kay Chen Tan, "A multi-facet survey on memetic computation," *IEEE transactions on Evolutionary Computation*, vol. 15, no. 5, pp. 591-607, October 2011.
[9] Yew-Soon Ong, Meng-Hiot Lim, Ferrante Neri, Hisao Ishibuchi, "Special issue on emerging trends in soft computing: memetic algorithms," Soft Comput. J., vol. 13, nos. 8-9, pp. 1-2, March 2009.
[10] Pablo Moscato, "On evolution, search, optimization, genetic algorithms and martial arts: towards memetic algorithms," Tech. Rep. Caltech Concurrent Computation Program, California Institute of Technology, Pasadena, Calif., Tech. Rep. 826, 1989.
[11] Dimitri Bertsekas, *Nonlinear Programming*, Athena Scientific, 1999, 2nd Ed.
[12] Hans-George Beyer, *The Theory of Evolution Strategies*, Natural Computing Series, Springer, 2001.
[13] D. Goldberg, "Genetic algorithms in search, optimization, and machine learning, Artificial Intelligence, Addison-Wesley Pub. Co., 1989.
[14] H.-G. Beyer and H.-P. Schwefel. "Evolution Strategies: A Comprehensive Introduction," *Journal Natural Computing*, vol. 1, no. 1, pp. 3-52, 2002.
[15] Kennedy, J.; Eberhart, R. (1995). "*Particle Swarm Optimization*". *Proceedings of IEEE International Conference on Neural Networks*, pp. 1942-1948.
[16] M. Dorigo & L. M. Gambardella, "Ant Colony System: A Cooperative Learning Approach to the Traveling Salesman Problem," *IEEE Transactions on Evolutionary Computation*, vol. 1, no. 1, pp. 53-66. 1997.
[17] Storn, R.; Price, K. (1997). "Differential evolution—a simple and efficient heuristic for global optimization over continuous spaces". *Journal of Global Optimization* vol. 11, pp. 341-359.
[18] D. Simon, "Biogeography-based optimization," *Evolutionary Computation, IEEE Transactions on*, vol. 12, pp. 702-713, December 2008.
[19] P. Larrañaga and J. A Lozano, *Estimation of Distribution Algorithms: A New Tool for Evolutionary Computation*, Kluwer Academic Publishers, 2001.
[20] D. Karaboga B. Basturk, "An artificial bee colony (ABC) algorithm for numeric function optimization," in *IEEE Swarm Intelligence Symposium* 2006, Indianapolis, Ind., May 12-14, 2006.
[21] M. Pacula, "Evolutionary Algorithms for Compiler-Enabled Program Autotuning," *PhD thesis*, Massachusetts Institute of Technology, June 2011.
[22] A. E. Eiben and J. E. Smith. *Introduction to Evolutionary Computing*, Springer-Verlag, 2003.
[23] Ying Li, Yanning Zhang, Rongchun Zhao, and Licheng Jiao, "The immune quantum-inspired evolutionary algorithm," Proc. 2004 IEEE International Conference on Systems, Man, and Cybernetics, 2004.
[24] Gexiang Zhang, "Quantum-inspired evolutionary algorithms: a survey and empirical study," Journal of Heuristics, vol. 17, Issue 3, pp. 303-351.
[25] Y. Tan and Y. Zhu, Fireworks algorithm for optimization. ICSI 2010, Part I, LNCS 6145, pp. 355-364, 2010.
[26] Ying Tan, *Fireworks Algorithm: A Novel Swarm Intelligence Optimization Method*, Springer, 2015.
[27] R. G. Gallager, *Stochastic Processes: theory for applications*, Cambridge University Press, 2013.
[28] M. S. Arulampalam, S. Maskell, N. Gordon, and T. Clapp, "A tutorial on particle filters for online nonlinear/non-Gaussian Bayesian tracking," *IEEE Transactions on Signal Processing*, vol. 50, Issue 2, pp. 174-188, 2002.
[29] F. Gustafsson and G. Hendeby, "Some relations between extended and unscented Kalman filters," *IEEE Transactions on Signal Processing*, vol. 60, no. 2, pp. 545-555, February 2012.

The invention claimed is:

1. An electromechanical system comprising
one or a plurality of motors;
means for measuring quantities of at least one from the group of electrical currents of a motor's stator winding, voltage, magnetic flux, and the angular speed of a motor's rotor;
a control module generating an electrical signal on the basis of online estimated values of at least one system parameter and at least one selected from the group of a reference signal and measured signals;
means for feeding the electrical signals generated by the control module to said one or a plurality of motors; and
a processing module, wherein the processing module executes a method for online estimating one or a plurality of system parameters, the method based on a mathematical model, the mathematical model comprising input, state, output, and one or a plurality of system parameters wherein the output represents the quantities measured and the input represents the electrical signals generated by the control module, the method comprising:
constructing a cost function based on at least one selected from the group of the reference signals, the measured signals, the control module's electrical signals, and estimated values of state variables at time instants in a subset of the union of the training period and the system operation period as a function of a vector comprising one or a plurality of components representing said one or a plurality of system parameters;

determining an estimated value of the vector comprising one or a plurality of components representing said one or a plurality of parameters with a memetic algorithm reducing the cost function.

2. The system of claim 1, wherein the memetic algorithm comprises:

obtaining an initial set of feasible candidate solutions, a feasible candidate solution being defined as a possible value of the vector comprising one or a plurality of components representing said one or a plurality of system parameters, making the initial set of feasible candidate solutions a current feasible candidate solution set;

generating additional feasible candidate solution sets by steps comprising:
 a) determining the fitness of each feasible candidate solution in the current feasible candidate solution set by using the cost function;
 b) selecting one or a plurality of feasible candidate solutions from the current feasible candidate solution set;
 c) from each feasible candidate solution selected in step b), successively generating one or a plurality of feasible candidate solutions by searching along descent directions associated with the cost function;
 d) making the union of the current feasible candidate solution set and a subset of the feasible candidate solutions generated in step c) the current feasible candidate solution set;
 e) Creating a new current feasible candidate solution set according to an evolutionary algorithm;

and iterating steps a) through e) until a termination condition is satisfied.

3. The system of claim 2, wherein said successively generating one or a plurality of candidate solutions by searching along descent directions associated with the cost function comprises initializing a vector variable, $\mu^c$ to said each feasible candidate solution selected in step b);

generating additional vector values by steps comprising:
 c1) finding a descent direction vector associated with the cost function from the current value of the vector variable, $\mu^c$;
 c2) determining a scalar step size;
 c3) performing multiplication of the scalar step size in step c2) and the descent direction vector in step c1);
 c4) performing vector addition of the current value of the vector variable, and the result of scalar-vector multiplication in step c3);
 c5) determining whether the result of said vector addition in c4) is a feasible candidate solution and updating the value of the vector variable, $\mu^c$ to the result of said vector addition if the result of said vector addition is a feasible candidate solution;

if the result of said vector addition is not a feasible candidate solution then keeping the current value of the vector variable, $\mu^c$ or updating the vector variable $\mu^c$ to a feasible candidate solution obtained by modifying the result of said vector addition; and iterating steps comprising c1) through c5) until a termination condition is satisfied.

4. The system of claim 3, wherein said evolutionary algorithm comprises at least one of a genetic algorithm, a particle swarm optimization algorithm, an ant colony optimization algorithm, an artificial bee colony algorithm, a biogeography-based optimization algorithm, a quantum-inspired evolutionary algorithm, an immune quantum-inspired evolutionary algorithm, an estimation-of-distribution algorithm, a fireworks algorithm, differential evolution algorithms, or an evolution strategy algorithm.

5. The system of claim 4, wherein said finding a descent direction vector associated with the cost function from the current value of the vector variable, $\mu^c$ in step c1) comprises computing a negative gradient of the cost function at the current value of the vector variable, $\mu^c$.

6. The system of claim 3, wherein said finding a descent direction vector associated with the cost function from the current value of the vector variable, $\mu^c$ in said step c1) comprises:

computing a gradient of the cost function at the current value of the vector variable, $\mu^c$; and finding a vector whose inner product with said gradient is negative.

7. The system of claim 3, wherein the cost function is based on at least one of a mean square of a difference between the reference signal data and estimated values of one or a plurality of state variables, a mean square of a difference between the reference signal data and output data, or a mean square of a difference between the output data corresponding to a state variable and estimated values of the state variable.

8. The system of claim 7, wherein said evolutionary algorithm comprises at least one of a genetic algorithm, a particle swarm optimization algorithm, an ant colony optimization algorithm, an artificial bee colony algorithm, a biogeography-based optimization algorithm, a quantum-inspired evolutionary algorithm, an immune quantum-inspired evolutionary algorithm, an estimation-of-distribution algorithm, a fireworks algorithm, differential evolution algorithms, or an evolution strategy algorithm.

9. The system of claim 7, wherein
the estimated values of one or a plurality of state variables are obtained according to at least one of a Kalman filter, an extended Kalman filter, an unscented Kalman filter, or a particle filter.

10. The system of claim 7, wherein the speed of a rotor's speed is represented by a state variable, and the output data includes electrical currents of a rotor's winding.

11. The system of claim 10, the estimated values of one or a plurality of state variables are obtained according to at least one of a Kalman filter, an extended Kalman filter, an unscented Kalman filter, or a particle filter.

12. The system of claim 11, wherein the cost function is based on at least one of a mean square of a difference between reference data of a rotor's speed and estimated values of the rotor's speed, a mean square of a difference between reference data of a rotor's speed and measured values of the rotor's speed, or a mean square of a difference between estimated values of a rotor's speed and measured values of the rotor's speed.

13. The system of claim 12, wherein said evolutionary algorithm comprises at least one of a genetic algorithm, a particle swarm optimization algorithm, an ant colony optimization algorithm, an artificial bee colony algorithm, a biogeography-based optimization algorithm, a quantum-inspired evolutionary algorithm, an immune quantum-inspired evolutionary algorithm, an estimation-of-distribution algorithm, a fireworks algorithm, differential evolution algorithms, or evolution strategy algorithms.

14. The system of claim 13, wherein said one or a plurality of parameters of a system comprises at least one element of a covariance matrix of process noise or measurement noise.

15. The system of claim 3, wherein modifying the result of said vector addition comprises projecting the vector addition on a prescribed set of vector values.

16. A non-transitory computer-readable storage medium having instructions stored thereon, when executed by one or more processors, the instructions carry out a method for online estimating of one or a plurality of parameters of an electromechanical system, the method based on a mathematical model, the mathematical model comprising input, state, output, and said one or a plurality of parameters wherein the output represents quantities measured and the input represents control signals, the method comprising:

constructing a cost function based on at least one selected from the group reference signals, measured signals, the control signals, and estimated values of state variables at time instants in a subset of the union of the training period and the system operation period as a function of a vector comprising one or a plurality of components determining an estimated value of the vector comprising said one or a plurality of components representing said one or a plurality of parameters with a memetic algorithm reducing the cost function, the memetic algorithm comprising:

obtaining an initial set of feasible candidate solutions, a feasible candidate solution being defined as a value of the vector comprising one or a plurality of components representing said one or a plurality of parameters in a predefined set of vector values, making the initial set of feasible candidate solutions a current feasible candidate solution set;

generating additional feasible candidate solution sets by steps comprising:

a) determining the fitness of each feasible candidate solution in the current feasible candidate solution set by using the cost function;

b) selecting one or a plurality of feasible candidate solutions from the current feasible candidate solution set;

c) from each feasible candidate solution selected in step b), successively generating one or a plurality of feasible candidate solutions by searching along descent directions associated with the cost function;

d) making the union of the current feasible candidate solution set and a subset of the feasible candidate solutions generated in step c) the current feasible candidate solution set;

e) Creating a new current feasible candidate solution set according to an evolutionary algorithm;

and iterating steps a) through e) until a termination condition is satisfied, wherein said successively generating one or a plurality of feasible candidate solutions by searching along descent directions associated with the cost function comprises initializing a vector variable, $\mu^c$ to said each feasible candidate solution selected in step b);

generating additional vector values by steps comprising:

c1) finding a descent direction vector associated with the cost function from the current value of the vector variable, $\mu^c$;

c2) determining a scalar step size;

c3) performing multiplication of the scalar step size in step c2) and the descent direction vector in step c1);

c4) performing vector addition of the current value of the vector variable, $\mu^c$ and the result of scalar-vector multiplication in step c3);

c5) determining whether the result of said vector addition in c4) is a feasible candidate solution and updating the value of the vector variable, $\mu^c$ to the result of said vector addition if the result of said vector addition is a feasible candidate solution, if the result of said vector addition is not a feasible candidate solution then keeping the current value of the vector variable, $\mu^c$ or modifying the result of said vector addition to a feasible candidate solution and updating the vector variable, $\mu^c$ to the feasible candidate solution resulting from the modification; and iterating steps comprising c1) through c5) until a termination condition is satisfied.

17. The method of claim 16, wherein said evolutionary algorithm comprises at least one of a genetic algorithm, a particle swarm optimization algorithm, an ant colony optimization algorithm, an artificial bee colony algorithm, a biogeography-based optimization algorithm, a quantum-inspired evolutionary algorithm, an immune quantum-inspired evolutionary algorithm, an estimation-of-distribution algorithm, a fireworks algorithm, differential evolution algorithms, or an evolution strategy algorithm.

18. The method of claim 16, wherein the state variables at each time t is represented by a column vector, denoted by x(t), comprising state variables at time t, and the output of the mathematical model at each time t is represented by a column vector, denoted by y(t), and the state vector x(t) at time t and the output vector y(t) at time t are mathematically related by $$y(t)=C(t)x(t)+Z(t),$$

where C(t) is a measurement matrix at time t, C(t)x(t) denotes pre-multiplying x(t) by C(t), and Z(t) represents the measurement noise at time t, and said one or a plurality of parameters include a covariance matrix of the measurement noise of the system, and the initial set of feasible candidate solutions include a feasible candidate solution having a covariance value of the measurement noise obtained by a process comprising:

estimating state variables of the system, estimating covariance matrices of the state variables, and maintaining in a memory module a subset of estimated values of the state variables, estimated values of the states' covariance matrices, and measured output variables associated with one or a plurality of time instants;

for each time instant, s that is in a subset, T, of time instants associated with which said estimated values of the state variables, said estimated values of the states' covariance matrices, and said measured output variables are in the memory module, performing steps comprising:

a) pre-multiplying the estimated value of the state vector x(s) at time s by the matrix C(s);

b) from measurement vector, y(s), at time s, subtract the column vector resulting from step a);

c) transposing the column vector resulting from step b) to a row vector;

d) post-multiplying the column vector resulting from step b) with the row vector resulting from step c);

e) pre-multiplying the estimated value of the covariance matrix of x(s) by the C(s), the measurement matrix at time s;
f) post-multiplying the matrix resulting from step e) by the transpose of the matrix C(s);
g) subtracting the matrix resulting from step f) from the matrix resulting from step d);
Computing a weighted average of matrices resulting from step g) at time instants in said subset denoted by T.

19. The method of claim 16, wherein the state variables at each time t is represented by a column vector, denoted by x(t), comprising state variables at time t;
the input of the mathematical model at time t is represented by a column vector, denoted by u(t);
the state vector x(t) at time t and the state vector x(t+g) at time t+g are mathematically related by $$x(t+g)=f(x(t),u(t),t,g)+W(t),$$

where f(,,,) is a mapping and W(t) represents the process noise at time t; said one or a plurality of parameters include a covariance matrix of the process noise of the system;
and the initial set of feasible candidate solutions include a feasible candidate solution having a covariance matrix value of the process noise obtained by a process comprising:
estimating at each time t(N) in a set, T={t(1), t(2), . . . , t(m)}, of time instances where m is a positive integer, the state vector x(t(N-1)) and state vector x(t(N)) on the basis of output data available unit time instant t(N) and maintaining in a memory module the estimate of x(t(M-1)) made at time t(M), $\hat{x}[t(M-1)|t(M)]$, and the estimate of x(t(M)) made at time t(M),
$\hat{x}[t(M-1)|t(M)]$ for each of M=N-K,N-K+1, . . . ,N-1, N for a predetermined finite integer K;

computing $$\hat{x}[t(M-1)|t(M)]-f(\hat{x}[t(M-1)|t(M)],u[t(M-1)],t(M-1),t(M)-t(M-1))$$

for M=N-K,N-K+1, . . . ,N-1, N for a predetermined finite integer K at each time t(N) in the set, T, of time instance;
transporting $$\hat{x}[t(M-1)|t(M)]-f(\hat{x}[t(M-1)|t(M)],u[t(M-1)],t(M-1),t(M)-t(M-1))$$

to a row vector $$\{\hat{x}[t(M-1)|t(M)]-f(\hat{x}[t(M-1)|t(M)],u[t(M-1)],t(M-1),t(M)-t(M-1))\}$$

for M=N-K,N-K+1, . . . ,N-1, N for a predetermined finite integer K at each time t(N) in the set, T, of time instance;
performing matrix multiplication $$\{\hat{x}[t(M-1)|t(M)]-f(\hat{x}[t(M-1)|t(M)],u[t(M-1)],t(M-1),t(M)-t(M-1))\}\cdot\{\hat{x}[t(M-1)|t(M)]-f(\hat{x}[t(M-1)|t(M)],u[t(M-1)],t(M-1),t(M)-t(M-1))\}^T$$

for M=N-K,N-K+1, . . . ,N-1, N for a predetermined finite integer K at each time t(N) in the set, T, of time instance;
computing a weighted average of $$\{\hat{x}[t(M-1)|t(M)]-f(\hat{x}[t(M-1)|t(M)],u[t(M-1)],t(M-1),t(M)-t(M-1))\}\cdot\{\hat{x}[t(M-1)|t(M)]-f(\hat{x}[t(M-1)|t(M)],u[t(M-1)],t(M-1),t(M)-t(M-1))\}^T$$

over M=N-K,N-K+1, . . . , N-1, N for a predetermined finite integer K at each time t(N) in the set, T, of time instance.

20. The method of claim 19, wherein said estimating at each time t(N) comprises performing at least one of a Kalman filter, an extended Kalman filter, an unscented Kalman filter, or a particle filter.

* * * * *

UNITED STATES PATENT AND TRADEMARK OFFICE
CERTIFICATE OF CORRECTION

PATENT NO.         : 10,846,596 B2
APPLICATION NO.    : 15/360995
DATED              : November 24, 2020
INVENTOR(S)        : Daniel Chonghwan Lee It is certified that error appears in the above-identified patent and that said Letters Patent is hereby corrected as shown below:

In the Specification

Column 5, Lines 2 and 3, the portion of the mathematical expression labeled as (11), "$\left(C\hat{P}[t|t-1]C^T + R\right) - 1CP[t|t-1]$" should be changed to $\left(C\hat{P}[t|t-1]C^T + R\right)^{-1} C\hat{P}[t|t-1]$.

Column 7, Line 37, "$\hat{W}_\mu[t|t]$" should be changed to -- $\hat{\omega}_\mu[t|t]$ --.

Column 10, Line 17, "T$l$" should be changed to -- $\tau_l$ --.

Column 15, Line 51, in the mathematical expression labeled as (27), the portion "$A\left(\hat{\omega}_\mu[t|t]\dfrac{\partial \hat{x}_\mu[t|t]}{\partial \mu}\right)$" should be changed to -- $A\left(\hat{\omega}_\mu[t|t]\right)\dfrac{\partial \hat{x}_\mu[t|t]}{\partial \mu}$ --.

Column 18, Line 48, the "$\mu$" of the left-hand side of the displayed mathematical equation, $\mu = (\mu_1,\mu_2,\mu_3,\mu_4,\mu_5,\mu_6,\mu_7)^T$, should be changed to -- μ --;

Column 18, Line 54, the "$\mu$" on the left-hand side of the displayed equation,
$$\text{cost}(\mu) = \frac{1}{T}\sum_{i=1}^{T}\left\{\hat{\omega}_\mu[t|t] - \omega^*[t]\right\}^2$$
, should be changed to -- μ --;

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,846,596 B2

Column 18, Line 54, "$\sum_{i=1}^{T}$" in the right-hand side of the displayed mathematical equation, $$\text{cost}(\mu) = \frac{1}{T}\sum_{i=1}^{T}\{\hat{\omega}_\mu[t|t] - \omega^*[t]\}^2$$

, should be changed to -- $\sum_{t=1}^{T}$ --;

Column 18, Line 64, the "$\mu$" on the left hand side of the displayed equation, $$\text{cost}(\mu) = \frac{1}{T}\sum_{i=1}^{T}\{\hat{\omega}_\mu[t|t] - \omega^*[t]\}^2$$

, should be changed to -- $\boldsymbol{\mu}$ --;

Column 18, Line 64, "$\sum_{i=1}^{T}$" in the right-hand side of the displayed mathematical equation, $$\text{cost}(\mu) = \frac{1}{T}\sum_{i=1}^{T}\{\hat{\omega}_\mu[t|t] - \omega^*[t]\}^2$$

, should be changed to -- $\sum_{t=1}^{T}$ --.

Column 19, Line 42, "vector $\mu$" should be changed to --vector $\boldsymbol{\mu}$ --;

Column 19, Line 45, in the portion, cost($\mu$), of the left-hand side of the equation labelled (31), the "$\mu$" should be changed to -- $\boldsymbol{\mu}$ --.

Column 23, Line 59, in the portion, $c(\mu)$, of the left-hand side of the equation, the "$\mu$" should be changed to -- $\boldsymbol{\mu}$ --;

Column 23, Line 63, "$\omega[t|t]$" in the in-line mathematical expression should be changed to -- $\hat{\omega}[t|t]$ --.

Column 24, Line 13, in the displayed mathematical expression $\frac{\partial c}{\partial \mu}(\mu)$, the "($\mu$)" should be changed to -- ($\boldsymbol{\mu}$) --;

Column 24, Line 16, the phrase "parameter $\mu$" should be changed to -- parameter $\boldsymbol{\mu}$ --;

Column 24, Line 60, "$\hat{\omega}[t|t-1], \hat{P}[t|t-1]$," should be changed to -- $\hat{\omega}[t|t-1], \hat{P}[t|t-1], \hat{x}[t|t-1]$ --.

Column 25, Line 1, the phrase "point $\mu$" should be changed to -- point $\boldsymbol{\mu}$ --;

CERTIFICATE OF CORRECTION (continued)

Column 25, Line 8, the phrase "at $\mu$" should be changed to -- at $\mu$ --;

Column 25, Line 9, the phrase "value $\mu$" should be changed to -- value $\mu$ --.

Column 26, Line 31, the portion of the section title "ILD Real-Time" should be changed to -- II.D Real-Time --;

Column 26, Line 50, the portion of the mathematical expression "$T_1 + T_2 + \cdots + T_{l-1} + T_1\}$" should be changed to -- $T_1 + T_2 + \cdots + T_{l-1} + T_l\}$ --.

Column 27, Line 41, the portion, "$+T_1 + T_{l+1}$" of the mathematical expression should be changed to -- $+T_l + T_{l+1}$ --;

Column 27, Line 44, the portion, "1 = 1,2," of the mathematical expression should be changed to -- $l$ = 1,2, --.

Column 28, Line 8, the mathematical expression "$w[t|\tau]$" should be changed to -- $\hat{\omega}[t|\tau]$ --;

Column 28, Line 8, "w[$t$]" should be changed to -- $\omega[t]$ --.

Column 32, Line 53, the mathematical expression "$p_Q(x[i], w[i] | x[i-1], w[i-1])$" should be changed to -- $p_Q(x[i], \omega[i] | x[i-1], \omega[i-1])$ --.

Column 34, Line 56, the portion "$\lambda[i]$" of the mathematical expression should be changed to -- $\chi[i]$ --.

Column 35, Line 1, "X[i]" should be changed to -- $\chi[i]$ --;

Column 35, Line 25, the "$\leq$" in the mathematical expression labelled as (3.35) should be changed to -- $\geq$ --.

Column 36, Line 18, the portion "$Q_l$", of the displayed mathematical expression should be changed to -- $\hat{Q}_l$ --;

Column 36, Line 38, the mathematical expression "$\omega[i-1|i-1]$" should be changed to -- $\hat{\omega}[i-1|i-1]$ --.

Column 37, Line 12, the mathematical expression "$\hat{Q}_1$" should be changed to -- $\hat{Q}_l$ --.

Column 45, Lines 32 through 33, the "≤" in the mathematical expression labelled as (4.35) should be changed to -- ≥ --.

Column 50, Lines 36 through 40, in the mathematical expression labelled as (4.47a), change the portion "
$$\left\{ \begin{pmatrix} \hat{x}[N-i-1|N-i-1] \\ \hat{\omega}[N-i-1|N-i-1] \end{pmatrix} - \begin{pmatrix} A(\hat{\omega}[N-i-1|N-i-1]) & 0 \\ 0 & 1 \end{pmatrix} \begin{pmatrix} \hat{x}[N-i-1|N-i-1] \\ \hat{\omega}[N-i-1|N-i-1] \end{pmatrix} - Bu[N-i-1] \right\}$$
" to --
$$\left\{ \begin{pmatrix} \hat{x}[N-i|N-i] \\ \hat{\omega}[N-i|N-i] \end{pmatrix} - \begin{pmatrix} A(\hat{\omega}[N-i-1|N-i-1]) & 0 \\ 0 & 1 \end{pmatrix} \begin{pmatrix} \hat{x}[N-i-1|N-i-1] \\ \hat{\omega}[N-i-1|N-i-1] \end{pmatrix} - Bu[N-i-1] \right\}$$
--.

In the Claims

Column 60, Line 2, the portion, "$\hat{x}[t(M-1)|t(M)] - f($", of the displayed mathematical expression should be changed to -- $\hat{x}[t(M)|t(M)] - f($ --;

Column 60, Line 7, the portion, "$\hat{x}[t(M-1)|t(M)] - f($", of the displayed mathematical expression should be changed to -- $\hat{x}[t(M)|t(M)] - f($ --;

Column 60, Line 12, the portion, "$\{\hat{x}[t(M-1)|t(M)]$", of the displayed mathematical expression should be changed to -- $\{\hat{x}[t(M)|t(M)]$ --;

Column 60, Line 13, the portion, "$-t(M-1))\}$", of the displayed mathematical expression should be changed to -- $-t(M-1))\}^T$ --;

Column 60, Line 17, the portion, "$\{\hat{x}[t(M-1)|t(M)]$", of the displayed mathematical expression should be changed to -- $\{\hat{x}[t(M)|t(M)]$ --;

Column 60, Line 18, the portion, "$\{\hat{x}[t(M-1)|t(M)]$", of the displayed mathematical expression should be changed to -- $\{\hat{x}[t(M)|t(M)]$ --;

CERTIFICATE OF CORRECTION (continued)
U.S. Pat. No. 10,846,596 B2

Column 60, Line 23, the portion, "$\{\hat{x}[t(M-1)|t(M)]\}$", of the displayed mathematical expression should be changed to --$\{\hat{x}[t(M)|t(M)]\}$--;

Column 60, Line 24, the portion, "$\{\hat{x}[t(M-1)|t(M)]\}$", of the displayed mathematical expression should be changed to --$\{\hat{x}[t(M)|t(M)]\}$--.